(12) United States Patent
Iwata et al.

(10) Patent No.: US 9,391,804 B2
(45) Date of Patent: *Jul. 12, 2016

(54) SYSTEM AND METHOD FOR IDENTIFYING COMMUNICATION BETWEEN VIRTUAL SERVERS

(71) Applicant: NEC Corporation, Tokyo (JP)

(72) Inventors: Atsushi Iwata, Tokyo (JP); Akio Iijima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,076

(22) Filed: Mar. 10, 2015

(65) Prior Publication Data

US 2015/0188729 A1    Jul. 2, 2015

Related U.S. Application Data

(63) Continuation of application No. 13/497,781, filed as application No. PCT/JP2010/066309 on Sep. 21, 2010, now Pat. No. 9,014,184.

(30) Foreign Application Priority Data

Sep. 24, 2009  (JP) .................................. 2009-218693

(51) Int. Cl.
   *H04L 12/46*  (2006.01)
   *H04L 12/713*  (2013.01)
   (Continued)

(52) U.S. Cl.
   CPC ........ *H04L 12/4666* (2013.01); *G06F 9/45558* (2013.01); *H04L 12/4633* (2013.01); *H04L 12/4641* (2013.01); *H04L 45/586* (2013.01); *H04L 45/741* (2013.01); *H04L 49/70* (2013.01); *H04L 61/2038* (2013.01); *H04L 61/6022* (2013.01); *G06F 2009/45595* (2013.01)

(58) Field of Classification Search
   None
   See application file for complete search history.

(56) References Cited

U.S. PATENT DOCUMENTS

| 6,085,238 A | 7/2000 | Yuasa et al. |
| 7,633,889 B2 * | 12/2009 | Higashitaniguchi  H04L 12/4666 |
| | | 370/256 |

(Continued)

FOREIGN PATENT DOCUMENTS

| CN | 1659539 A | 8/2005 |
| CN | 100568216 C | 12/2009 |

(Continued)

OTHER PUBLICATIONS

European Partial Search Report dated Feb. 5, 2015, (English-language version).

(Continued)

*Primary Examiner* — Hong Cho
(74) *Attorney, Agent, or Firm* — Finnegan, Henderson, Farabow, Garrett & Dunner LLP

(57) ABSTRACT

A server, includes a virtual machine identifier assigning section to assign an identifier of a virtual machine operating on the server; and a network interface to transmit a packet including a Layer 2 header information which includes the identifier of the virtual machine and a first packet field for a VLAN-Tag, wherein the network interface transmits the packet to a packet encapsulate section which encapsulates a second packet field including the Layer 2 header information with a virtual network identifier representing a virtual network to which the virtual machine belongs.

8 Claims, 15 Drawing Sheets

(51) Int. Cl.
*H04L 29/12* (2006.01)
*H04L 12/931* (2013.01)
*H04L 12/56* (2006.01)
*G06F 9/455* (2006.01)

(56) References Cited

U.S. PATENT DOCUMENTS

| | | | |
|---|---|---|---|
| 7,634,681 | B2 | 12/2009 | Takamoto et al. |
| 7,835,356 | B2 | 11/2010 | Bar-Kovetz et al. |
| 8,054,832 | B1 | 11/2011 | Shukla et al. |
| 8,165,023 | B2 | 4/2012 | Khalid et al. |
| 8,213,429 | B2 | 7/2012 | Wray et al. |
| 8,255,496 | B2 | 8/2012 | Shukla et al. |
| 9,043,792 | B1* | 5/2015 | Xu .................. H04L 49/70 370/218 |
| 2003/0002468 | A1* | 1/2003 | Khalil ............... H04L 12/4641 370/338 |
| 2003/0200295 | A1 | 10/2003 | Roberts et al. |
| 2005/0025143 | A1 | 2/2005 | Chen et al. |
| 2005/0175022 | A1 | 8/2005 | Nishimura et al. |
| 2006/0098681 | A1 | 5/2006 | Cafiero et al. |
| 2007/0121615 | A1 | 5/2007 | Weill et al. |
| 2007/0140263 | A1 | 6/2007 | Mitome et al. |
| 2008/0019360 | A1 | 1/2008 | Belgaied et al. |
| 2008/0025297 | A1 | 1/2008 | Kashyap |
| 2008/0240122 | A1 | 10/2008 | Richardson et al. |
| 2008/0263544 | A1 | 10/2008 | Amano et al. |
| 2009/0083445 | A1* | 3/2009 | Ganga .................. G06F 15/16 709/250 |
| 2009/0129385 | A1 | 5/2009 | Wray et al. |
| 2009/0240790 | A1 | 9/2009 | Utsunomiya et al. |
| 2011/0032843 | A1 | 2/2011 | Papp et al. |

FOREIGN PATENT DOCUMENTS

| | | |
|---|---|---|
| JP | 2002-016640 A | 1/2002 |
| JP | 2007-060610 A | 3/2007 |
| JP | 2007-158870 A | 6/2007 |
| JP | 2008-271050 A | 11/2008 |
| JP | 2008-278478 A | 11/2008 |
| JP | 2009-177510 A | 8/2009 |

OTHER PUBLICATIONS

Non-Final Office Action dated Nov. 12, 2013 in co-pending U.S. Appl. No. 13/497,781.
Final Office Action dated Mar. 28, 2014 in co-pending U.S. Appl. No. 13/497,781.
Non-Final Office Action dated Aug. 7, 2014 in co-pending U.S. Appl. No. 13/497,781.
Notice of Allowance dated Dec. 9, 2014 in co-pending U.S. Appl. No. 13/497,781.
Chinese Office Action dated Dec. 26, 2013, with an English translation.
International Search Report in PCT/JP2010/066309 dated Oct. 19, 2010 (English translation thereof).
Cisco (registered trademark) VN-Link: Virtualization correspondence networking; Aug. 30, 2009 http://www.cisco.com/web/JP/solution/places/datacenter/literature/white_paper_c11-525307.html.
Recognition of the Virtual machine individually and realization of network which can be cared every virtual machine; Aug. 30, 2009 http://www.cisco.com/web/JP/news/cisco_news_letter/tech/vnlink/index.html.
United States Office Action dated Sep. 28, 2015 in co-pending U.S. Appl. No. 14/644,100.
Extended European Search Report dated Jun. 30, 2015.

* cited by examiner

Fig. 1
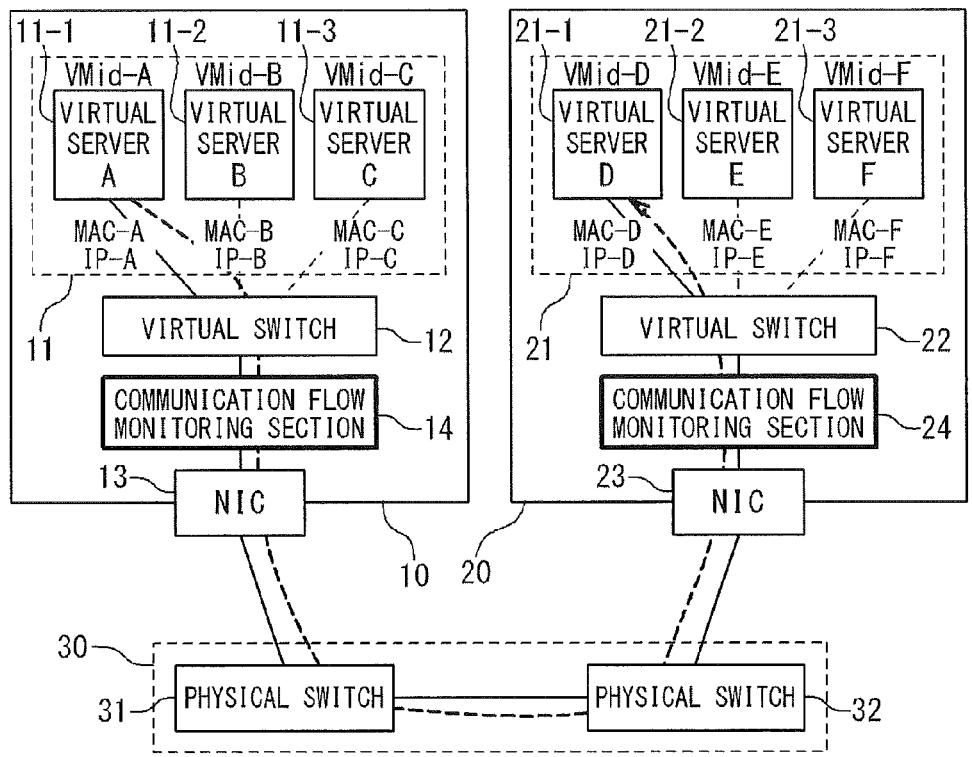
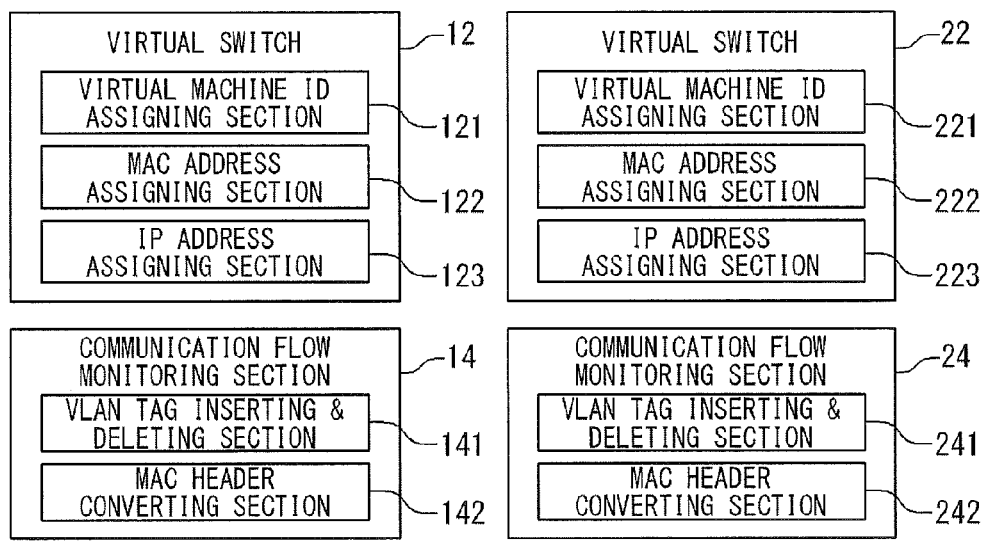

Fig. 2

(1) COMMUNICATION FROM VIRTUAL SERVER A (MAC-A) TO VIRTUAL SERVER D (MAC-D)

| MAC DA | MAC SA | User Data |
|---|---|---|
| MAC-D | MAC-A | |

(2) IN VIRTUAL SWITCH OR NIC, INSERT VLAN TAGS FOR 2 STAGES CORRESPONDING TO ID (Dest ID) OF DESTINATION VIRTUAL SERVER AND ID (Source ID) OF SOURCE VIRTUAL SERVER

| MAC DA | MAC SA | VLAN Tag | VLAN Tag | User Data |
|---|---|---|---|---|
| MAC-D | MAC-A | VMid-D | VMid-A | |
| | | Dest ID | Source ID | |

VLAN TAG 2-STAGE INSERTION (3) CONFIRM COMMUNICATION FLOW STATE IN NIC – PHYSICAL SWITCH – NIC
· CHECK COMMUNICATION FLOW IN WHICH VLAN TAGS FOR 2 STAGE MATCH, MEASURE PERFORMANCE AND DIAGNOSE FAULT

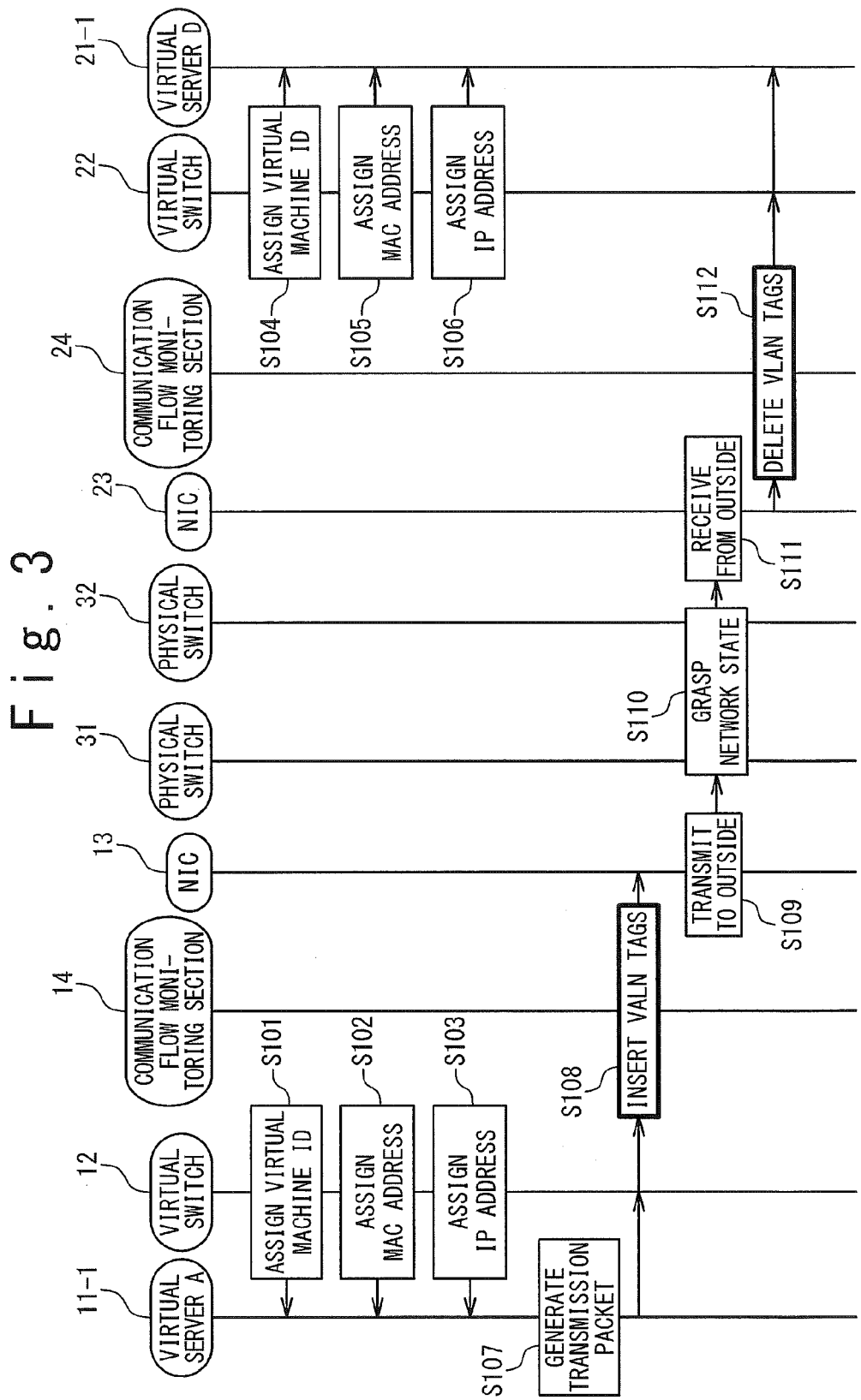

Fig. 4

(1) COMMUNICATION FROM VIRTUAL SERVER A (MAC-A) TO VIRTUAL SERVER D (MAC-D)

| MAC DA | MAC SA | User Data |
|--------|--------|-----------|
| MAC-D  | MAC-A  |           |

(2) IN VIRTUAL SWITCH OR NIC, CONVERT (MAC NAT) MAC DA/MAC SA CORRESPONDING TO ID (Dest ID) OF DESTINATION VIRTUAL SERVER AND AND ID (Source ID) OF SOURCE VIRTUAL SERVER

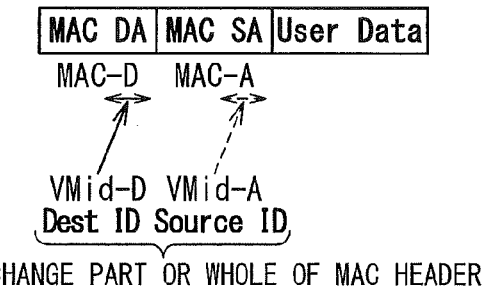

CHANGE PART OR WHOLE OF MAC HEADER (3) CONFIRM COMMUNICATION FLOW STATE IN NIC - PHYSICAL SWITCH - NIC
  · CHECK COMMUNICATION FLOW IN WHICH VIRTUAL SERVER ID USED FOR PART OR WHOLE OF MAC DA/MAC SA MATCH, MEASURE PERFORMANCE AND DIAGNOSE FAULT

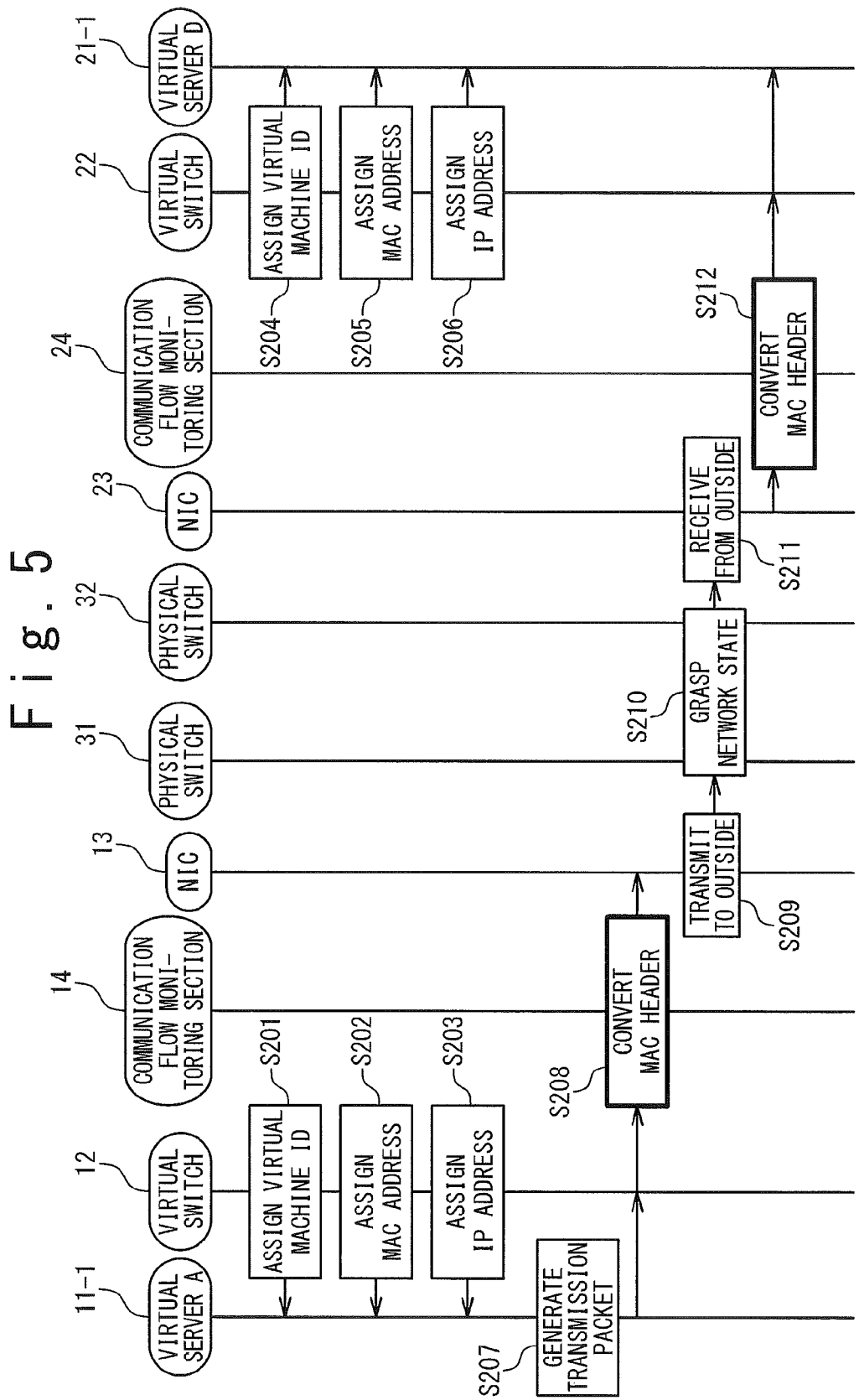

Fig. 6

(1) COMMUNICATION FROM VIRTUAL SERVER A (MAC-A) TO VIRTUAL SERVER D (MAC-D)

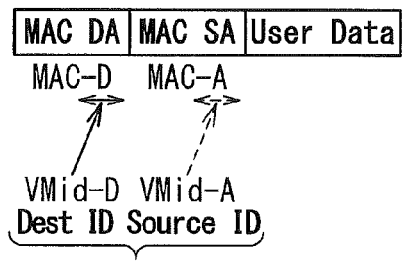

a) ASSIGN VIRTUAL SERVER ID (VMid) TO PART OR WHOLE OF MAC ADDRESS FROM START
b) SET WHOLE OF MAC ADDRESS TO PRIVATE MAC ADDRESS, CARRY OUT ADDRESS ASSIGNMENT HIERARCHICALLY, AND MAKE IT CORRESPOND TO VMid SPACE (2) CONFIRM COMMUNICATION FLOW STATE IN NIC – PHYSICAL SWITCH – NIC

· CHECK COMMUNICATION FLOW IN WHICH VIRTUAL SERVER ID USED FOR PART OR WHOLE OF MAC DA/MAC SA MATCH, MEASURE PERFORMANCE AND DIAGNOSE FAULT

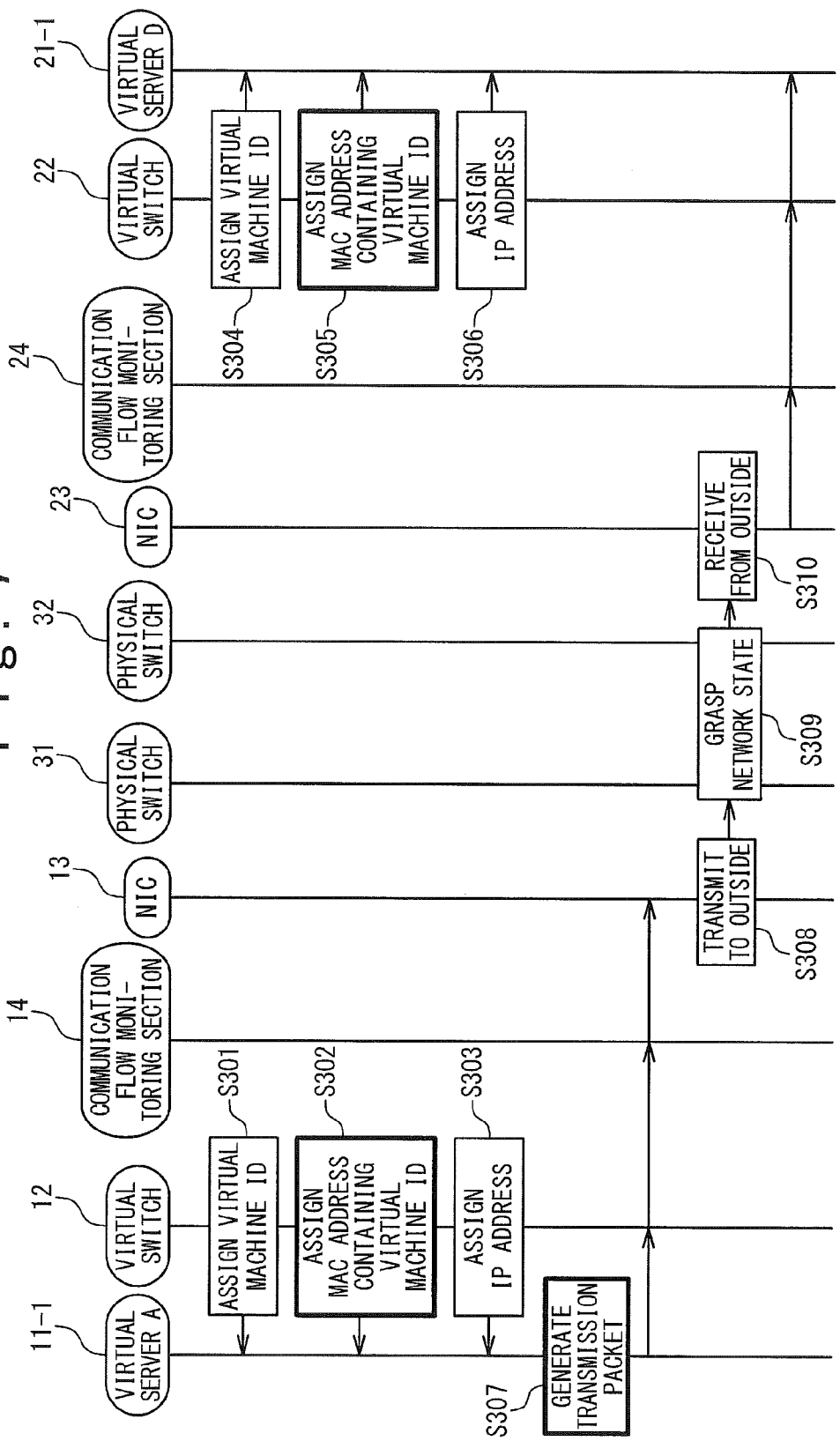

Fig. 8

(1) COMMUNICATION FROM VIRTUAL SERVER A (MAC-A) TO VIRTUAL SERVER D (MAC-D)

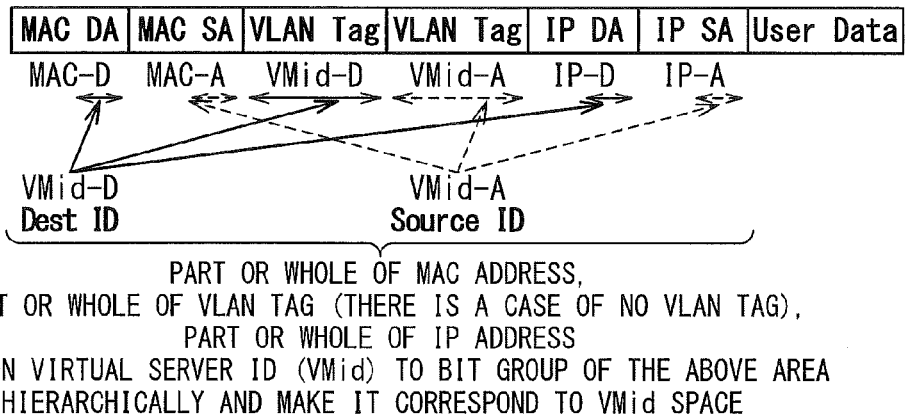

PART OR WHOLE OF MAC ADDRESS,
PART OR WHOLE OF VLAN TAG (THERE IS A CASE OF NO VLAN TAG),
PART OR WHOLE OF IP ADDRESS
ASSIGN VIRTUAL SERVER ID (VMid) TO BIT GROUP OF THE ABOVE AREA
HIERARCHICALLY AND MAKE IT CORRESPOND TO VMid SPACE (2) CONFIRM COMMUNICATION FLOW STATE IN NIC – PHYSICAL SWITCH – NIC

· CHECK COMMUNICATION FLOW IN WHICH EACH OF VIRTUAL SERVER IDS USED IN THE ABOVE AREA MATCHES, MEASURE PERFORMANCE AND DIAGNOSE FAULT

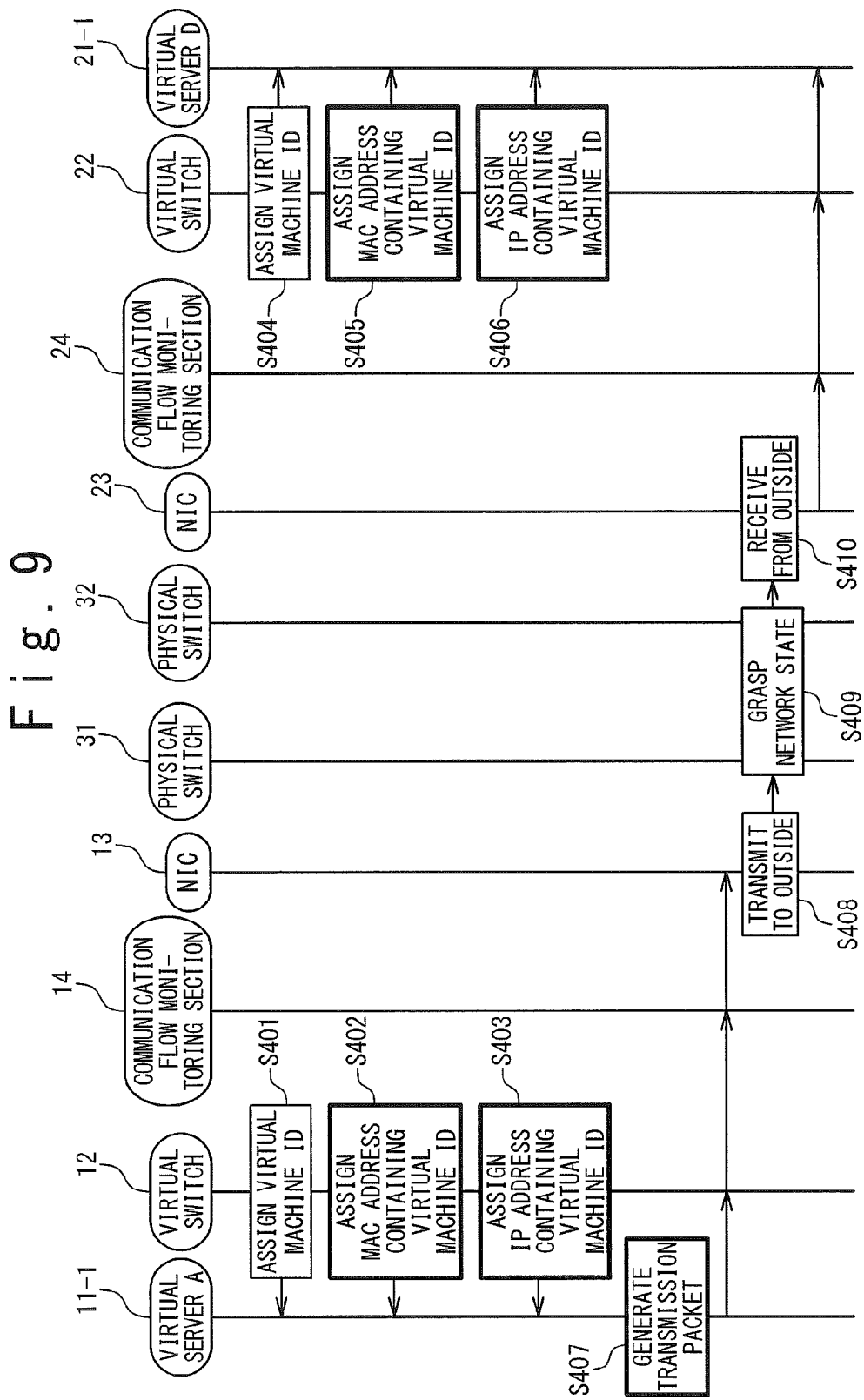

Fig. 10
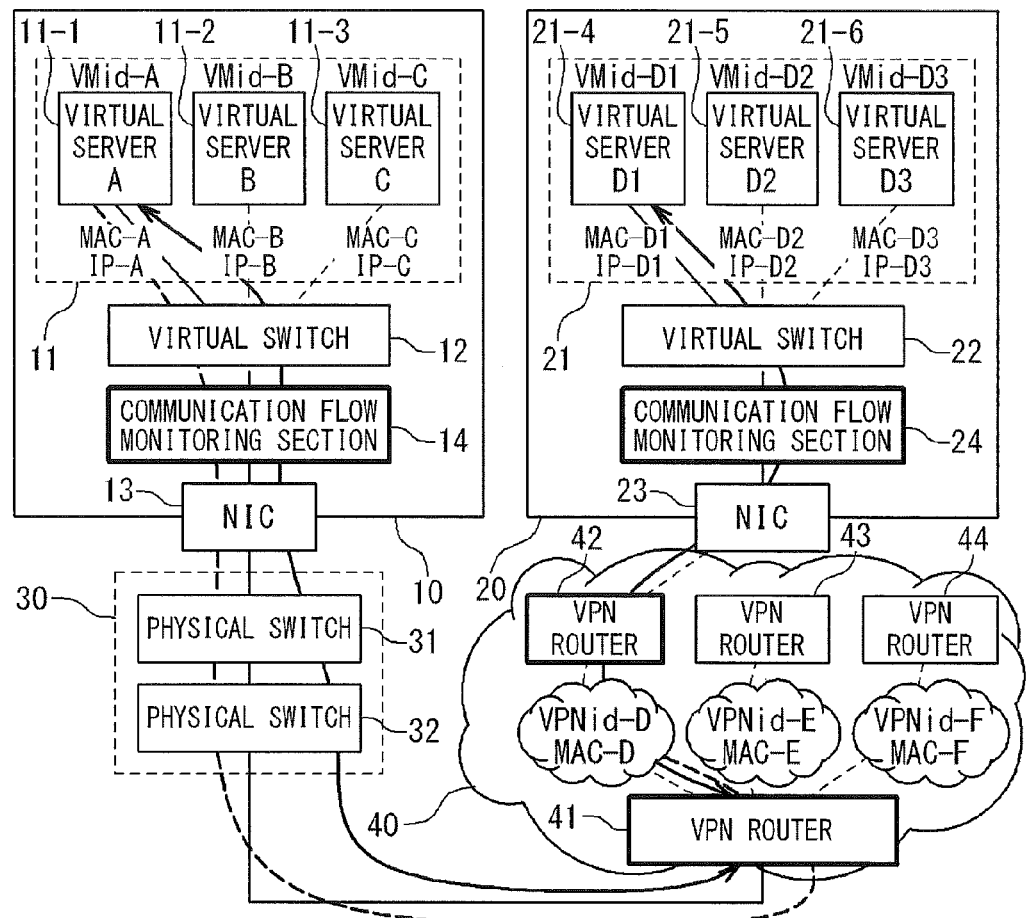
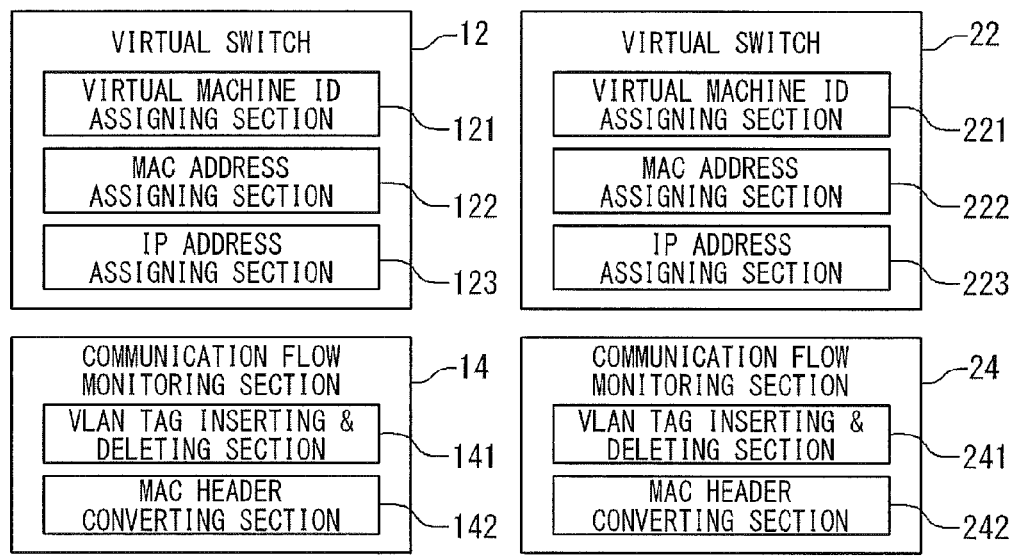

Fig. 11

(1) COMMUNICATION FROM VIRTUAL SERVER A (MAC-A) TO VIRTUAL SERVER D1 (MAC-D1)

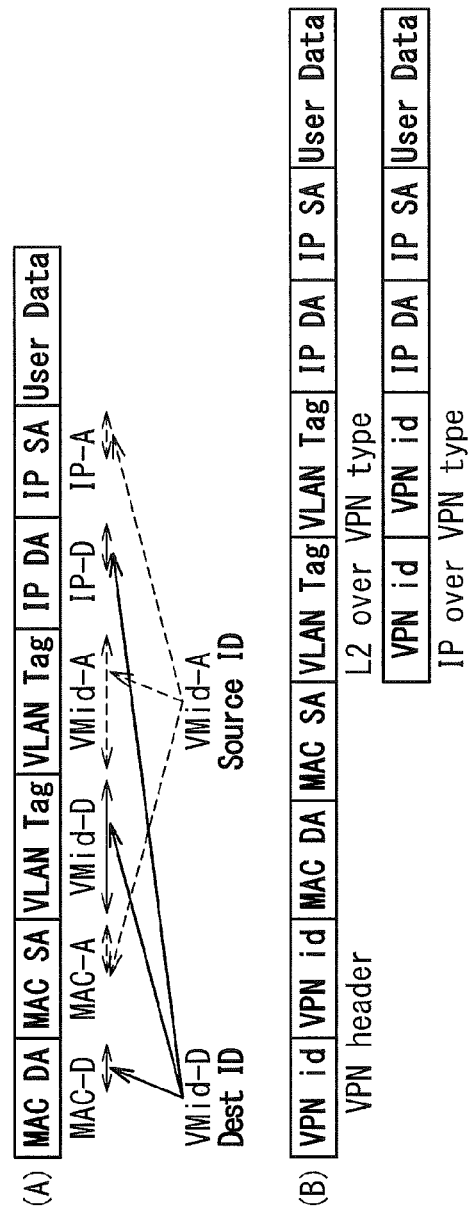

(A) | MAC DA | MAC SA | VLAN Tag | VLAN Tag | IP DA | IP SA | User Data |

MAC-D  MAC-A  VMid-D  VMid-A  IP-D  IP-A

VMid-D        VMid-A
Dest ID       Source ID (B) | VPN id | MAC DA | MAC SA | VLAN Tag | VLAN Tag | IP DA | IP SA | User Data |

VPN header

L2 over VPN type

| VPN id | IP DA | IP SA | User Data |

IP over VPN type

PART OR WHOLE OF MAC ADDRESS,
PART OR WHOLE OF VLAN TAG (THERE IS A CASE OF NO VLAN TAG),
PART OR WHOLE OF IP ADDRESS
ASSIGN VIRTUAL SERVER ID (VMid) TO BIT GROUP OF
THE ABOVE AREA HIERARCHICALLY AND MAKE IT CORRESPOND TO VMid SPACE
ID MAINTENANCE FUNCTION IS REALIZED SO AS TO HAVE RELATION FOR RECOGNIZING COMMUNICATION FLOW IN
End-to-End EVEN THROUGH HEADER CONVERSION IN L2 over VPN TYPE, IP over VPN TYPE IN RELAY VPN ROUTER (2) IN CASE OF L2 over VPN type, RELATE VLAN-id and VPN-id,
    UNIQUELY CONNECT ID SPACE IN PAIR OF MAC/IP/VPN-ids OR
    REMAINING MAC/IP/VLAN-ids (3) IN CASE OF IP over VPN type, UNIQUELY IDENTIFY ID SPACE IN
    PAIR OF IP/VPN-ids OR IP/VLAN-ids

Fig. 14

(1) COMMUNICATION FROM VIRTUAL SERVER A (MAC-A) TO VIRTUAL SERVER D (MAC-D)

| MAC DA | MAC SA | VLAN Tag | IP DA | IP SA | User Data |
|---|---|---|---|---|---|
| MAC-D | MAC-A | GP-1<br>GROUP ID | IP-D | IP-A | |

(2) COMMUNICATION BETWEEN VIRTUAL SERVERS HAVING IDENTICAL GROUP ID (GP-1)

| MAC DA | MAC SA | VLAN Tag | IP DA | IP SA | User Data |
|---|---|---|---|---|---|
| MAC-D | MAC-A | GP-1 | VMid-D<br>VMid-A | IP-D | IP-A |

VMid-D
Dest ID

VMid-A
Source ID

IN VIRTUAL SWITCH OR NIC,
PART OR WHOLE OF MAC ADDRESS,
PART OR WHOLE OF VLAN TAG (THERE IS A CASE OF NO VLAN TAG),
PART OR WHOLE OF IP ADDRESS
ASSIGN DESTINATION VIRTUAL SERVER ID (Dest ID),
SOURCE VIRTUAL SERVER ID (Source ID) TO AT LEAST ONE OF THE BIT GROUPS OF THE ABOVE AREA

# SYSTEM AND METHOD FOR IDENTIFYING COMMUNICATION BETWEEN VIRTUAL SERVERS

CROSS-REFERENCE TO RELATED APPLICATIONS

The present application is a Continuation Application of U.S. patent application Ser. No. 13/497,781, filed on Mar. 22, 2012, which is based on International Application No. PCT/JP2010/066309 filed on Sep. 21, 2010, and which claims priority from Japanese Patent Application No. 2009-218693 filed on Sep. 24, 2009, the entire contents of which are hereby incorporated by reference.

TECHNICAL FIELD

The present invention is related to an inter-virtual-server communication identifying system, and more particularly, to an inter-virtual-server communication identifying system in case of a communication between a plurality of logical servers operating on physical servers.

BACKGROUND ART

Generally, a plurality of logical servers operating on physical servers are often configured of virtual machines and so on. Conventionally, there are the following two problems in case of a communication between the logical servers which operating on the physical servers.
(1) First Problem The first problem is as follows. There is no case that a protocol header is added as a new identifier to the existing traffic in the existing router and switch, in order to know the communication condition between the logical servers. Therefore, it is difficult for a network manager to grasp in real time, the communication condition on which of routes is used for the communication, how is a communication quality, and where a communication fault has occurred, even if the communication is carried out by using a MAC (Media Access Control) address, an IP (Internet Protocol) address, a VLAN (Virtual Local Area Network) ID (identifier), and so on assigned to the logical server.
(2) Second Problem The second problem is as follows. In case of an operation condition under the multi-tenant environment such as a data center, there is a case that the IP addresses overlap in case of the communication between virtual machines in the multi-tenant environment. In such a case, it is impossible to carry out the communication, unless the re-numbering of the IP address or address conversion through NAT (Network Address Translation) is carried out. However, in order to carry out the re-numbering of the IP address, it is required to stop service so that a large load is imposed. It should be noted that it is supposed that NAT contains NAPT (Network Address Port Translation) such as IP masquerade. Also, because NAT is dependent on application, the NAT could not be used unless confirming that application is coordinated. Therefore, there was a case which a problem had occurred in the communication among the virtual machines under the multi-tenant environment.

Regarding (1), in the condition that a protocol header as a new identifier is not added to the existing traffic, the router and switch for relay have not a function of grasping a communication flow condition between the virtual machines. Therefore, it is difficult to grasp a communication path, a communication performance, and a communication fault situation in real time.

Regarding (1), there is a VN-Tag technique of Cisco (registered trademark) which can solve the above problems by adding a protocol header as a new identifier to the existing traffic (Non-Patent Literatures 1 and 2). The function of grasping the communication condition is realized in the VN-Tag technique by introducing a special router and switch which can insert the new header into the existing packet is proposed. However, because the new header cannot be grasped by the existing router or switch which cannot grasp the VN-Tag, the communication flow condition between the virtual machines cannot be grasped in the general environment which coexists with the existing network.

Therefore, it is required to allow a network manager to grasp the communication flow condition between the virtual machines in real time while keeping backward compatibility in the existing Internet network.

Regarding (2), in the multi-tenant environment which provides a server, a storage and network environment for a plurality of enterprises by the data center and so on, there is a case that addresses assigned to the virtual machines overlap. In each company, the address assignment in the intranet is typically implementing by using a space of private IP addresses.

It should be noted that the private IP address is an IP address used in the network not connected directly with the Internet (e.g. the in-house network) such as a perfectly closed network which is not connected with an external network (the Internet), and a network connected indirectly with the external network (the Internet) through a router and so on. The private IP address is also referred to as a private address.

Even if the addresses are uniquely assigned in the in-house system, there is a case that the addresses overlap between the companies. Therefore, when the IP addresses assigned to virtual machines on a server outsourced to the data center overlap, the inter-virtual-machine communication between companies (multi-tenants) cannot be conventionally carried out unless the address re-numbering and NAT are carried out. However, there is a problem on operation in case of either of the address re-renumbering or the NAT.

Therefore, in the multi-tenant network of the data center, it is required that the virtual machine communication between multi-tenants can be carried out even under the environment that the IP addresses of the virtual machines overlap, and a network manager can grasp the communication flow condition in real time.

As the related techniques, JP 2008-278478A (Patent Literature 1) discloses a computing system and a communication control method. In this related technique, data showing a pair of a virtual machine and a physical machine on which the virtual machine operates is recorded in a memory shared by the virtual machine and a virtual machine environmental control function. Also, it is determined whether or not a counter-end virtual machine exists on the same physical machine as the virtual machine, based on the above-mentioned recorded data. Also, a multiplicity is changed by the determination. Moreover, when the virtual machine migrates to another physical machine, the above-mentioned recorded data is rewritten.

JP 2007-158870A (Patent Literature 2) discloses a virtual computer system and a network communication method. In this related technique, switching is carried out between a VLAN communication according to a VLAN ID set to a virtual network interface card (NIC) and a VLAN communication according to a VLAN ID set by an OS on the virtual machine which uses the virtual network interface card, based on whether or not to the VLAN ID is set to the virtual network interface card.

It should be noted that in this related technique, VLAN is realized by using a tag VLAN which is standardized in IEEE 802.1Q. In a communication packet prescribed in IEEE 802.1Q, a VLAN tag field is added to a communication packet which does not contain the VLAN tag (VLAN Tag). The VLAN tag field is composed of a tag type and tag control data, and 12 bits of the tag control data are assigned for the VLAN ID.

CITATION LIST

[Patent Literature 1] JP 2008-278478A
[Patent Literature 2] JP 2007-158870A
[Non-Patent Literature 1] Cisco (registered trademark) VN-Link: Virtualization correspondence networking http://www.cisco.com/web/JP/solution/places/datacenter/literature/white_paper_c11-525307.html
[Non-Patent Literature 2] Recognition of virtual machine individually and realization of network which can be cared every virtual machine <http://www.cisco.com/web/JP/news/cisco_news_letter/tech/vnlink/index.html>

SUMMARY OF THE INVENTION

A first object of the present invention is to make it possible for a network manager to grasp a communication flow condition between virtual machines in real time while keeping backward compatibility in the existing Internet network.

A second object of the present invention is to make it possible for a network manager to grasp a communication flow condition in real time while an inter-multi-tenant communication between virtual machines can be carried out even under the environment that IP addresses of the virtual machines overlap in a multi-tenant network of a data center.

An inter-virtual-server communication identifying system of the present invention includes a reception-side physical server, a transmission-side physical server and a physical switch. The reception-side physical server assigns a reception-side virtual machine ID (identifier) to a reception-side virtual server. The transmission-side physical server assigns a transmission-side virtual machine ID to a transmission-side virtual server. Also, the transmission-side physical server assigns the reception-side virtual machine ID and the reception-side virtual machine ID to at least a part of a bit space of a field other than a data field of a transmission packet in a form of TCP/IP (Transmission Control Protocol/Internet Protocol) packet, when generating the transmission packet from the transmission-side virtual server to the reception-side virtual server, and transmits the transmission packet. The physical switch is provided on a network connecting the transmission-side physical server and the reception-side physical server, and identifies the transmission packet based on the reception-side virtual machine ID and the reception-side virtual machine ID which are contained in the bit space, when relaying the transmission packet between the transmission-side physical server and the reception-side physical server, and grasps data indicating a network condition.

A physical server of the present invention is provided with a virtual server, a virtual switch, and an NIC. The virtual server is assigned with a virtual machine ID (identifier). The virtual switch controls a communication of the virtual server, and outputs a transmission packet in a form of TCP/IP (Transmission Control Protocol/Internet Protocol) packet, in case of a communication between the virtual server and another virtual server through a network. The NIC transmits the transmission packet onto the network.

In an inter-virtual-server communication identifying method, a reception-side virtual machine ID (identifier) is assigned to a reception-side virtual server by a reception-side physical server. A transmission-side virtual machine ID is assigned to a transmission-side virtual server by a transmission-side physical server. A transmission packet is transmitted by assigning the reception-side virtual machine ID and the transmission-side virtual machine ID to at least a part of a bit space of a field other than a data field of the transmission packet in a form of TCP/IP (Transmission Control Protocol/Internet Protocol) packet, when generating the transmission packet from the transmission-side virtual server to the reception-side virtual server. The transmission packet is identified based on the reception-side virtual machine ID and the transmission-side virtual machine ID which are contained in the bit space, to collect data indicating a network condition, by a physical switch provided on a network connecting the transmission-side physical server and the reception-side physical server, when relaying the transmission packet between the transmission-side physical server and the reception-side physical server.

A program of the present invention is a program to make a computer execute the steps of: controlling a communication of a virtual server assigned with a virtual machine ID (identifier); and transmitting on a network, a transmission packet which the virtual machine ID is assigned to at least a part of a bit space of a field other than a data field of the transmission packet in a form of TCP/IP (Transmission Control Protocol/Internet Protocol) packet, in case of a communication between the virtual server and another virtual server through the network.

The communication flow condition between the virtual machines can be grasped in the network by using a field where the existing router and switch can grasp.

BRIEF DESCRIPTION OF THE DRAWINGS

FIG. 1 is a diagram showing a configuration example of an inter-virtual-server communication identifying system of the present invention;

FIG. 2 is a diagram showing a first exemplary embodiment of the present invention;

FIG. 3 is a sequence diagram showing a communication flow control in the first exemplary embodiment of the present invention;

FIG. 4 is a diagram showing a second exemplary embodiment of the present invention;

FIG. 5 is a sequence diagram showing the communication flow control in the second exemplary embodiment of the present invention;

FIG. 6 is a diagram showing a third exemplary embodiment of the present invention;

FIG. 7 is a sequence diagram showing the communication flow control in the third exemplary embodiment of the present invention;

FIG. 8 is a diagram showing a fourth exemplary embodiment of the present invention;

FIG. 9 is a sequence diagram showing the communication flow control in the fourth exemplary embodiment of the present invention;

FIG. 10 is a diagram showing a configuration example of a data center in multi-tenant environment;

FIG. 14 is a diagram showing a sixth exemplary embodiment of the present invention.

DESCRIPTION OF EXEMPLARY EMBODIMENTS

Figure 11:
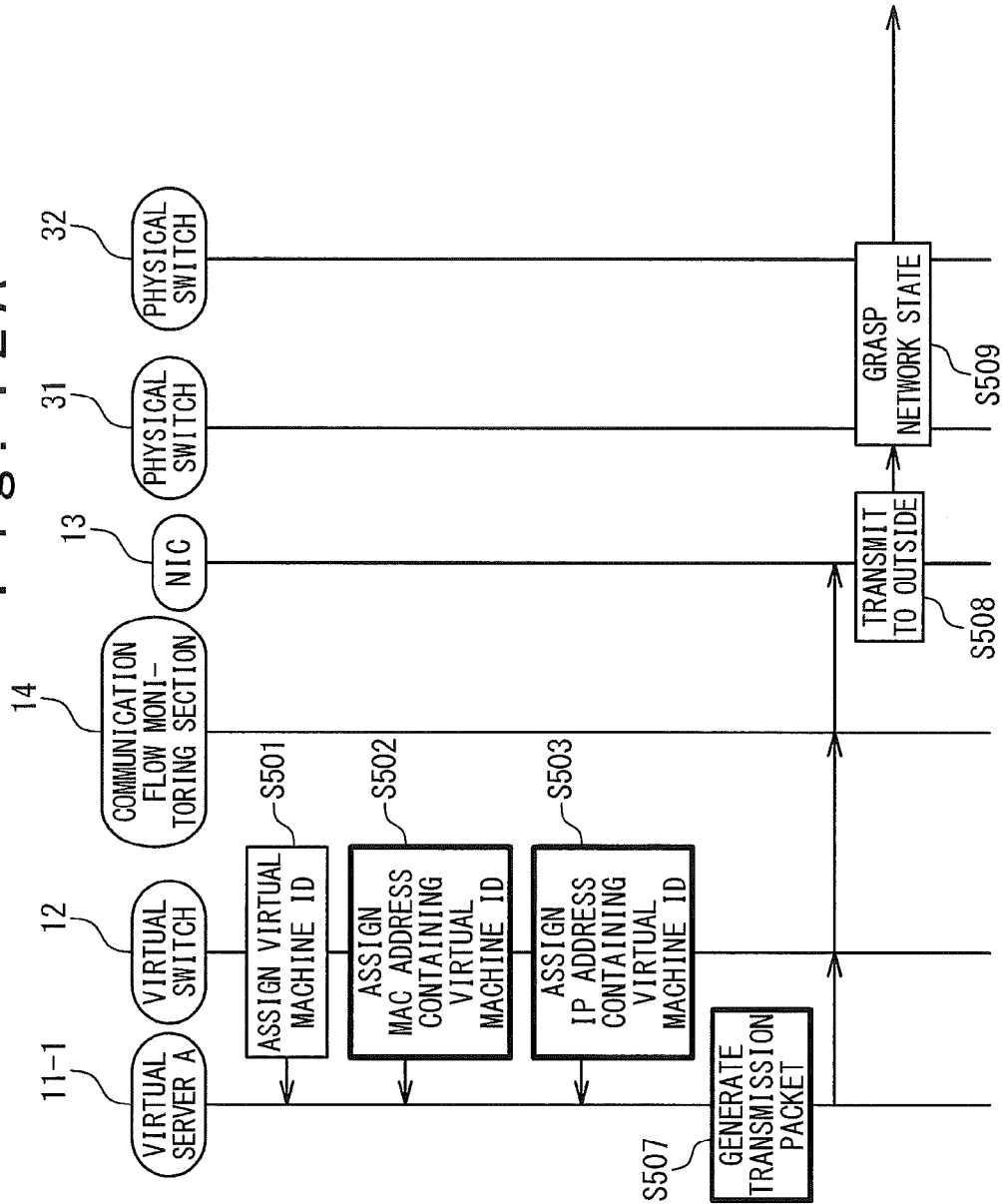
FIG. 11 is a diagram showing a fifth exemplary embodiment of the present invention.

Hereinafter, exemplary embodiments of the present invention will be described with reference to the attached drawings.

As shown in FIG. 1, an inter-virtual-server communication identifying system of the present invention is provided with a first physical server 10, a second physical server 20, and a network 30.

Here, as an example of the first physical server 10 and the second physical server 20, computers such as a PC (personal computer), a client server, a work station, a mainframe, and a supercomputer are exemplified. It should be noted that it is sufficient that each of the first physical server 10 and the second physical server 20 is sufficient to be a server which can be connected with the network and can realize the environment under which virtual machines are possible to operate. Therefore, as another example of the first physical server 10 and the second physical server 20, a mobile terminal, a car navigation system, a home game machine, an interactive TV, a digital tuner, a digital recorder, information home appliance, an OA (Office Automation) equipment and so on are exemplified. Also, the first physical server 10 and the second physical server 20 may be mounted on moving bodies such as a vehicle, a ship, and an aircraft. However, actually, it is not limited to these examples.

Also, as an example of the network 30, the Internet, a LAN (Local Area Network), a wireless LAN, a WAN (Wide Area Network), a backbone, a fixation telephone network, a mobile telephone network, WiMAX (IEEE 802.16a), 3G (3rd Generation), a lease line, a community antenna television (CATV) line, an IrDA (Infrared Data Association), a Bluetooth (registered trademark), a serial communication circuit and so on are exemplified. However, actually, the present invention is not limited to these examples.

The first physical server 10 is provided with virtual servers 11 (11-$i$, i=1 to n: n is an optional natural number), a virtual switch 12, a NIC (Network Interface Card) 13, and a communication flow monitoring section 14. In the same way, the second physical server 20 is provided with virtual servers 21 (21-$i$, i=1 to n), a virtual switch 22, a NIC 23 and a communication flow monitoring section 24. The network 30 contains a physical switch 31 and a physical switch 32.

The virtual servers 11 (11-$i$, i=1 to n) are virtual machines which operate on the first physical server 10. In the same way, the virtual servers 21 (21-$i$, i=1 to n) are virtual machines which operate on the second physical server 20. Here, as an example of the virtual servers 11 (11-$i$, i=1 to n), a virtual server "A" 11-1, a virtual server "B" 11-2, and a virtual server "C" 11-3 are shown. Also, as an example of the virtual servers 21 (21-$i$, i=1 to n), the virtual server "D" 21-1, the virtual server "E" 21-2 and the virtual server "F" 21-3 are shown. It should be noted that actually, the number of virtual servers 21 (21-$i$, i=1 to n) does not have to be the same as the number of virtual servers 11 (11-$i$, i=1 to n).

The virtual switch 12 carries out a communication control of each of the virtual servers (11-$i$, i=1 to n) on the first physical server 10. In the same way, the virtual switch 22 carries out the communication control of each of the virtual servers (21-$i$, i=2-n) on the second physical server 20. As an example of each of the virtual switch 12 and the virtual switch 22, a hypervisor, a virtual machine monitor (VMM) and so on are exemplified. Here, it is assumed that the virtual switch 12 and the virtual switch 22 control the generation, operation, migration, stop and deletion of the virtual servers 11 (11-$i$, i=1 to n) and the virtual servers 21 (21-$i$, i=2 to n). However, actually, the present invention is not limited to these examples.

The virtual switch 12 is provided with a virtual machine ID assigning section 121, a MAC address assigning section 122, and an IP address assigning section 123. In the same way, the virtual switch 22 is provided with a virtual machine ID assigning section 221, a MAC address assigning section 222, and an IP address assigning section 223.

Each of the virtual machine ID assigning section 121 and the virtual machine ID assigning section 221 newly assigns a VLAN ID which the existing router and switch can grasp and identify, as a virtual machine ID (VMid) of a corresponding one of the virtual servers. The virtual machine ID is identification data which is different from a MAC address and an IP address and does not depend on the existing communication protocol.

Each of the MAC address assigning section 122 and the MAC address assigning section 222 assigns a MAC address to a corresponding one of the virtual servers. This MAC address is a private MAC address. The private MAC address can be freely set basically.

Each of the IP address assigning section 123 and the IP address assigning section 223 assigns an IP address to a corresponding one of the virtual servers. The IP address is a private IP address. The first physical server 10 and the second physical server 20 can know the MAC address of a counter-side virtual server by use of a command of ARP (Address Resolution Protocol) and a table, if the IP address of the counter-side virtual server is known.

It should be noted that a case that the plurality of physical servers use a private IP address is thought of. Also, it would be thought of that the virtual machine ID and the MAC address of each virtual server are used as destination data of each virtual server in the physical server, and the IP address assigned to the NIC in the physical server and the IP address of a host are shared. Therefore, there would be a case that the IP addresses of the respective virtual servers overlap.

Each of the NIC 13 and the NIC 23 is an extension card for connecting the computer with a LAN (Local Area Network). It should be noted that each of the NIC 13 and the NIC 23 may be a communication interface to connect with an antenna for the radio communication and the network except the LAN. Here, actually, the present invention is not limited to these examples.

Here, the NIC 13 is connected with the physical switch 31 in the network 30. The physical switch 31 in the network 30 is connected with the physical switch 32 in the network 30. The physical switch 32 in the network 30 is connected with the NIC 23. Here, as the relay physical switches, two of the physical switches 31 and the physical switches 32 are exemplified. However, actually, the number of physical switches may be one or equal to or more than three.

It should be noted that as an example of physical switch 31 and the physical switch 32, an open flow switch is exemplified. In this case, an open flow controller as a server for controlling the communication flow processing exists together with the open flow switches. The above-mentioned open flow controller is supposed to be contained in the network 30. Besides, as an example of each of the physical switch 31 and the physical switch 32, a router, a switching hub, and so on are exemplified. However, actually, the present invention is not limited to these examples.

The details of the open flow switch are described in the following literature. "OpenFlow Switch Specification Version 0.9.0 (Wire Protocol 0x98)" (Jul. 20, 2009 Current Maintainer) by Brandon Heller (brandonh@stanford.edu)" <http://www.openflowswitch.org/documents/openflow-spec-v0.9.0.pdf>

In case of the reception, each of the communication flow monitoring section 14 and the communication flow monitoring section 24 confirms the virtual machine ID (VMid) contained in the reception packet.

The communication flow monitoring section 14 is provided with at least one of a VLAN tag inserting and removing section 141 and a MAC header converting section 142. Similarly, the communication flow monitoring section 24 is provided with at least one of a VLAN tag inserting and removing section 241 and a MAC header converting section 242.

Each of the VLAN tag inserting and removing section 141 and the VLAN tag inserting and removing section 241 inserts a virtual machine ID (VMid) as a VLAN tag into a transmission packet in case of transmission, and removes the virtual machine ID (VMid) from the reception packet in case of reception.

Each of the MAC header converting section 142 and the MAC header converting section 242 converts a part or whole of each of "MAC DA (Destination Address)" and "MAC SA (Source Address)" contained in the MAC-DA/SA field as an MAC header field into a virtual machine ID (VMid) of a virtual server. Here, it is assumed that each of the MAC header converting section 142 and the MAC header converting section 242 converts a part or whole of "MAC DA" into a virtual machine ID (VMid) of a transmission destination virtual server in case of transmission, and converts a part or whole of "MAC SA" into a virtual machine ID (VMid) of a transmission source virtual server.

It should be noted that the communication flow monitoring section 14 may be contained in either of the virtual switch 12 or the NIC 13. In the same way, the communication flow monitoring section 24 may be contained in either of the virtual switch 22 or the NIC 23.

Also, it could be thought of that the communication flow monitoring section 14 is provided between the NIC 13 and the physical switch 31 and the communication flow monitoring section 24 is provided between the NIC 23 and the physical switch 32. Or, it could be thought of that the communication flow monitoring section 14 is provided in the physical switch 31 (physical switch closest to the first physical server 10) directly connected with the NIC 13, and the communication flow monitoring section 24 is provided in the physical switch 32 (physical switch closest to the second physical server 20) directly connected with the NIC 23.

Here, it is supposed that each of the virtual servers 11 (11-*i*, i=1 to n), the virtual servers 21 (21-*i*, i=1 to n), the virtual switch 12, the virtual switch 22, the communication flow monitoring section 14 and the communication flow monitoring section 24 is realized by a processor driven based on a software program to execute predetermined processing and a memory which stores the program and various data.

As an example of the above-mentioned processor, a CPU (Central Processing Unit), a microprocessor, a microcontroller or a semiconductor integrated circuit (Integrated Circuit (IC)) and so on which have a similar function are exemplified.

As an example of the above-mentioned memory, semiconductor memory devices such as RAM (Random Access Memory), ROM (Read Only Memory), EEPROM (Electrically Erasable and Programmable Read Only Memory) and flash memory, auxiliary storage units such as HDD (Hard Disk Drive) and SSD (Solid State Drive), and storage media such as DVD (Digital Versatile Disk) and a memory card and so on are exemplified.

Also, the above-mentioned memory may be a storage provided in a peripheral device (external HDD, and so on,) and a server (Web server, file server, and so on) in the network, in addition to a storage provided in the computer. Or, the above-mentioned memory may be a storage unit using DAS (Direct Attached Storage), FC-SAN (Fibre Channel-Storage Area Network), NAS (Network Attached Storage), IP-SAN (IP-Storage Area Network), and so on.

However, actually, the present invention is not limited to these examples.

First Exemplary Embodiment

Use of Virtual Machine ID (VMid) for VLAN Tag Stack

Referring to FIG. 2, a case that the virtual machine ID (VMid) is stacked and used as a VLAN tag will be described.

In a first exemplary embodiment of the present invention, the virtual machine ID assigning section newly assigns a VLAN ID which the existing router and switch can grasp and identify, as ID (VMid) of each virtual machine. In case of communication from the virtual server "A" to the virtual server "D", the communication is carried out by inserting a 2-stage tag of "VMid-A" and "VMid-D" in the packet. That is, th 2-stage tag is two virtual machine IDs (VMid) stacked as the VLAN tag.

Specifically, it is as follows. For example, in case of the communication from the virtual server "A" to the virtual server "D", a transmission packet which contains "MAC DA"-"MAC SA"-"User Data (Data packet)" is transmitted as a TCP/IP (Transmission Control Protocol/Internet Protocol) packet from the physical server on the transmission side, as in (1) of FIG. 2. In this case, the VLAN tag inserting and removing section is provided for either of the virtual switch or the NIC in FIG. 1, and a 2-stage tag like (2) of FIG. 2 is inserted into the transmission packet by the VLAN tag inserting and removing section in transmission (VLAN tag 2-stage insertion), and the transmission packet is transmitted to the physical switch in the network.

The relay physical switch grasps a network condition by monitoring only the VLAN tag field of the TCP/IP packet. That is, the relay physical switch monitors the VLAN tag field of the TCP/IP packet and collects data of the network condition.

For example, in the open flow switch, an optional combination of the MAC address field, the VLAN tag field, the IP address field, and the port number field is set as identification data, in the TCP/IP packet and packets which have identical identification data are grasped as the concept of a "flow".

In this case, the relay physical switch monitors only the VLAN tag field of a TCP/IP packet, grasps a packet in which a combination of the virtual machine IDs contained in the VLAN tag field is same, as the same flow, collects data of the network condition from the flow and a destination of this flow, and transmits the collected data to the open flow controller. The open flow controller analyzes and displays the collected data of network condition on the management screen according to the necessity.

After removing the 2-stage tag from a reception packet by the VLAN tag inserting and removing section in the NIC or the virtual switch, said reception-side physical server transmits the reception packet to the reception-side virtual server "D".

FIG. 3 is a sequence diagram of a communication flow control in the first exemplary embodiment of the present invention.

(1) Step S101

In the first physical server 10 shown in FIG. 1, the virtual machine ID assigning section 121 of the virtual switch 12 assigns a virtual machine ID to each of the virtual servers 11 (11-$i$, $i$=1 to n).

(2) Step S102

Also, the MAC address assigning section 122 of the virtual switch 12 assigns a MAC address to each of the virtual servers 11 (11-$i$, $i$=1 to n).

(3) Step S103

Also, the IP address assigning section 122 of the virtual switch 12 assigns an IP address to each of the virtual servers 11 (11-$i$, $i$=1 to n).

(4) Step S104

In the same way, in the second physical server 20, the virtual machine ID assigning section 221 of the virtual switch 22 assigns a the virtual machine ID to each of the virtual servers 21 (21-$i$, $i$=1 to n).

(5) Step S105

Also, the MAC address assigning section 222 of the virtual switch 22 assigns a MAC address to each of the virtual servers 21 (21-$i$, $i$=1 to n).

(6) Step S106

Also, the IP address assigning section 222 of the virtual switch 22 assigns an IP address to each of the virtual servers 21 (21-$i$, $i$=1 to n).

(7) Step S107

In case of a communication from the virtual server "A" 11-1 to the virtual server "D" 21-1, in the first physical server 10, the transmission-side virtual server "A" 11-1 generates a TCP/IP packet which contains "MAC DA"-"MAC SA"-"User Data", and outputs it to the virtual switch 12 as a transmission packet. It should be noted that actually, in response to a data transmission request from the transmission-side virtual server 11, the virtual switch 12 may generate a TCP/IP packet every requesting virtual server 11.

(8) Step S108

The communication flow monitoring section 14 confirms the transmission packet from the virtual switch 12. The VLAN tag inserting and removing section 141 of the communication flow monitoring section 14 inserts a 2-stage tag in the transmission packet and outputs it to the NIC 13.

(9) Step S109

The NIC 13 transmits the transmission packet to the physical switch 31 on the network.

(10) Step S110

The physical switch 31 transmits the transmission packet to the physical switch 32. The physical switch 32 transmits the transmission packet to the reception-side second physical server 20. At this time, the physical switch 31 and the physical switch 32 grasp a network condition by monitoring the VLAN tag field of the transmission packet. That is, the physical switch 31 and the physical switch 32 monitor the VLAN tag field of the TCP/IP packet and collect data of the network condition.

(11) Step S111

In the reception-side second physical server 20, the NIC 23 receives the transmission packet and outputs it to the communication flow monitoring section 24 as a reception packet.

(12) Step S112

The communication flow monitoring section 24 confirms the reception packet which arrives at the NIC 23. The VLAN tag inserting and removing section 241 of the communication flow monitoring section 24 removes or deletes the 2-stage tag from the reception packet and then outputs the reception packet to the virtual switch 12. The virtual switch 12 transmits the reception packet to the reception-side virtual server "D" 21-1.

Through the above operation, the communication flow condition between the virtual machines can be grasped in the network by use of the field where the existing router and switch can grasp.

Second Exemplary Embodiment

Conversion of MAC Header into Virtual Machine ID (VMid)

Referring to FIG. 4, a case that a part or whole of the MAC header is converted into a virtual machine ID (VMid) will be described. Here, a case of an MAC header will be described as an example, but a case of the IP header is similar basically. It is supposed that a MAC header means the MAC address field of the TCP/IP packet and the IP header means the IP address field of the TCP/IP packet.

In a second exemplary embodiment of the present invention, the virtual machine ID assigning section assigns an ID (VMid) of each of the virtual machines to a part or whole of the MAC address field which the existing router and switch can grasp and identify. In case of the communication from the virtual server "A" to the virtual server "D", the communication is carried out by converting parts of "MAC DA" and "MAC SA" of the packet on the way.

Specifically, it is as follows. For example, in case of the communication from the virtual server "A" to the virtual server "D", in the transmission-side physical server, a packet which contains "MAC DA"-"MAC SA"-"User Data" as shown in (1) of FIG. 4 is transmitted as the TCP/IP packet. In this case, the MAC header converting section is provided for either of the virtual switch or the NIC. By converting the part or whole of "MAC DA" into the virtual machine ID "VMid-D" of the virtual server "D" by the MAC header converting section in transmission, as shown in (2) of FIG. 4, and by converting a part or whole of "MAC SA" into the virtual machine ID "VMid-A" of the virtual server "A", the transmission packet is transmitted to the physical switch in the network.

The relay physical switch grasps and finds the network condition by monitoring only the MAC-DA/SA field as a MAC header field of the TCP/IP packet. That is, the relay physical switch monitors the MAC header area of the TCP/IP packet and collects data of the network condition.

In said reception-side physical server, after converting MAC-DA/SA (parts of "MAC DA" and "MAC SA") of the reception packet into the original address, the MAC header converting section in the NIC or the virtual switch transmits to the reception-side virtual server "D".

FIG. 5 is a sequence diagram showing the communication flow control in the second exemplary embodiment of the present invention.

(1) Step S201

In the first physical server 10 shown in FIG. 1, the virtual machine ID assigning section 121 of the virtual switch 12 assigns a virtual machine ID to each of the virtual servers 11 (11-$i$, $i$=1 to n).

(2) Step S202

Also, the MAC address assigning section 122 of the virtual switch 12 assigns a MAC address to each of the virtual servers 11 (11-i, i=1 to n).

(3) Step S203

Also, the IP address assigning section 122 of the virtual switch 12 assigns an IP address to each of the virtual servers 11 (11-i, i=1 to n).

(4) Step S204

In the same way, in the second physical server 20, the virtual machine ID assigning section 221 of the virtual switch 22 assigns a virtual machine ID to each of the virtual servers 21 (21-i, i=1 to n).

(5) Step S205

Also, the MAC address assigning section 222 of the virtual switch 22, assigns a MAC address to each of the virtual servers 21 (21-i, i=1 to n).

(6) Step S206

Also, the IP address assigning section 222 of the virtual switch 22 assigns an IP address to each of the virtual servers 21 (21-i, i=1 to n).

(7) Step S207

In case of communication from the virtual server "A" 11-1 to the virtual server "D" 21-1, in the first physical server 10 shown in FIG. 1, the transmission-side virtual server "A" 11-1 generates a TCP/IP packet which contains "MAC DA"-"MAC SA"-"User Data" and outputs it to the virtual switch 12 as the transmission packet. Actually, the virtual switch 12 may generate the TCP/IP packet every requesting virtual server 11 in response to a data transmission request from the transmission-side virtual server 11.

(8) Step S208

The communication flow monitoring section 14 confirms the transmission packet from the virtual switch 12. The MAC header converting section 142 of the communication flow monitoring section 14 converts a part or whole of "MAC DA" into the virtual machine ID "VMid-D" of the virtual server "D" 21-1, and converts a part or whole of "MAC SA" into the virtual machine ID "VMid-A" of the virtual server "A" 11-1, and outputs the transmission packet after the conversion to the NIC 13.

(9) Step S209

The NIC 13 transmits the transmission packet to the physical switch 31 in the network.

(10) Step S210

The physical switch 31 transmits the transmission packet to the physical switch 32. The physical switch 32 transmits the transmission packet to the reception-side second physical server 20. At this time, each of the physical switch 31 and the physical switch 32 grasps and finds a network condition by monitoring MAC-DA/SA field which is the MAC header field. That is, the physical switch 31 and the physical switch 32 monitor the MAC-DA/SA field of the TCP/IP packet and collect data of the network condition.

(11) Step S211

In the reception-side second physical server 20, the NIC 23 receives and outputs the transmission packet to the communication flow monitoring section 24 as a reception packet.

(12) Step S212

The communication flow monitoring section 24 confirms the reception packet which arrives in the NIC 23. The MAC header converting section 242 of the communication flow monitoring section 24 converts the MAC-DA/SA field (parts of "MAC DA" and "MAC SA") of the reception packet into an original condition and outputs the reception packet to the virtual switch 12. The virtual switch 12 transmits the reception packet to the reception-side virtual server "D" 21-1.

Through the above operation, the communication flow condition between the virtual machines can be grasped in the network by using the field called MAC-DA/SA where existing router and switch can grasp and identify.

It should be noted that in the present exemplary embodiment, a case where a part or whole of the MAC header is converted into the virtual machine ID (VMid) will be described. However, actually, the part or whole of the IP header may be converted into the virtual machine ID (VMid). That is, a part or whole of at least one of the MAC header and the IP header (both are permitted) may be converted into the virtual machine ID (VMid).

At this time, for example, it is technically possible that a part or whole of the transmission-side MAC address field is converted into the transmission-side virtual machine ID (VMid), and a part or whole of the reception-side IP address field is converted into the reception-side virtual machine ID (VMid). Oppositely, it is possible that a part or whole of the transmission-side IP address field is converted into the transmission-side virtual machine ID (VMid) and a part or whole in the reception-side MAC address field is converted into the reception-side virtual machine ID (VMid).

Third Exemplary Embodiment

Assignment of MAC Address to Virtual Machine ID (VMid)

Referring to FIG. 6, a case where the virtual machine ID (VMid) is assigned to the MAC address in advance will be described. Here, although the case where the virtual machine ID (VMid) is assigned to the MAC address will be described, a case where the virtual machine ID (VMid) is assigned to the IP address is same basically.

In a third exemplary embodiment of the present invention, the virtual machine ID assigning section assigns the ID (VMid) of each virtual machine to a part or whole of the MAC address field which the existing router or switch can grasp and identify. In case of a communication from the virtual server "A" to the virtual server "D", the packet with "MAC DA" and "MAC SA", each of which is a MAC address assigned with each virtual machine ID (VMid) is transmitted as just as it is.

Specifically, it is as follows. For example, the transmission-side physical server provides the MAC address assigning section for the virtual switch, and the MAC address assigning section assigns the virtual machine ID of the virtual server to a part or whole of the MAC address which is assigned to each of the virtual servers, as in (1) of FIG. 6, in case of assigning an the MAC address to each of the virtual servers.

In this example, the MAC address assigning section generates the MAC addresses corresponding to the virtual machine IDs assigned to the virtual servers "A" and the virtual servers "D", and the generated the MAC addresses are assigned to the virtual servers "A" and the virtual servers "D", respectively.

It should be noted that as for the generated MAC address, there are a case that a part of the MAC address field corresponds to the virtual machine ID and a case that the whole of the MAC address field corresponds to the virtual machine ID. In the case of the communication from the virtual server "A" to the virtual server "D", the transmission-side virtual server "A" outputs the TCP/IP packet which contains the virtual machine ID, to MAC-DA/SA (parts of "MAC DA" and the "MAC SA").

The relay physical switch grasps a network condition by monitoring only the MAC-DA/SA field contained in the MAC address field of the TCP/IP packet. That is, the relay physical switch monitors the MAC-DA/SA field of the TCP/IP packet and collects data of the network condition.

The reception-side physical server transmits the TCP/IP packet to the reception-side virtual server "D".

In the second exemplary embodiment, a part or whole of the MAC address field of the transmission packet is converted into the virtual machine ID in transmission, while in the third exemplary embodiment, the virtual machine ID is incorporated into the MAC address assigned to each of the virtual servers in advance.

The MAC address which is assigned to each of the virtual servers is a private MAC address, and the virtual machine ID can be used for a part or whole of the MAC address field because it is basically possible to set freely.

For example, generally, the MAC address is configured of a bender ID of upper 3 octets (24 bits: 1 octet=8 bits) and a hardware ID of lower 3 octet (24 bits).

Therefore, it is thought of to use a virtual machine. ID for a part or whole of the hardware ID. Or, it is thought of to simply use the virtual machine ID for several bits from the head or end of the MAC address.

However, actually, the present invention is not limited to these examples.

FIG. 7 is a sequence diagram showing the communication flow control according to the third exemplary embodiment of the present invention.

(1) Step S301

At the first physical server 10 shown in FIG. 1, the virtual machine ID assigning section 121 of the virtual switch 12 assigns the virtual machine ID to each of the virtual servers 11 (11-$i$, $i$=1 to n).

(2) Step S302

Also, in case of assigning the MAC address to each of the virtual servers 11 (11-$i$, $i$=1 to n), the MAC address assigning section 122 of the virtual switch 12 assigns the MAC address using the virtual machine ID "VMid-A" of the virtual server "A" 11-1 for a part or whole of the MAC address field of the virtual server "A" 11-1.

(3) Step S303

Also, the IP address assigning section 122 of the virtual switch 12 assigns the IP address to each of the virtual servers 11 (11-$i$, $i$=1 to n).

(4) Step S304

In the same way, in the second physical server 20, the virtual machine ID assigning section 221 of the virtual switch 22 assigns the virtual machine ID to each of the virtual servers 21 (21-$i$, $i$=1 to n).

(5) Step S305

Also, the MAC address assigning section 222 of the virtual switch 22 assigns the MAC address using the virtual machine ID "VMid-D" of the virtual server "D" 21-1 to a part or whole of the MAC address field of the virtual server "D" 21-1 in case of assigning the MAC address to each of the virtual servers 21 (21-$i$, $i$=1 to n).

(6) Step S306

Also, the IP address assigning section 222 of the virtual switch 22 assigns the IP address to each of the virtual servers 21 (21-$i$, $i$=1 to n).

(7) Step S307

In case of communication from the virtual server "A" 11-1 to the virtual server "D" 21-1, in the first physical server 10, the transmission-side virtual server "A" 11-1 generates the TCP/IP packet containing "MAC DA"-"MAC SA"-"User Data", and outputs it to the virtual switch 12 as the transmission packet.

It should be noted that actually, the virtual switch 12 may generate a TCP/IP packet every requesting virtual server 11 in response to a data transmission request from the transmission-side virtual server 11. The virtual switch 12 outputs the transmission packet to the NIC 13. Here, the communication flow monitoring section 14 is not used.

(8) Step S308

The NIC 13 transmits the transmission packet to the physical switch 31 in the network.

(9) Step S309

The physical switch 31 transmits the transmission packet to the physical switch 32. The physical switch 32 transmits the transmission packet to the reception-side second physical server 20.

At this time, each of the physical switch 31 and the physical switch 32 grasps a network condition by monitoring the MAC-DA/SA field as an MAC header area of the transmission packet. That is, each of the physical switch 31 and the physical switch 32 monitors the MAC-DA/SA field of the TCP/IP packet and collects data of the network condition.

(10) Step S310

In the reception-side second physical server 20, the NIC 23 receives and outputs the transmission packet to the virtual switch 12 as the reception packet. The virtual switch 12 transmits the reception packet to the reception-side virtual server "D" 21-1.

Through the above operation, the communication flow condition between the virtual machines can be grasped in the network by use of the field called MAC-DA/SA where existing router and switch can grasp.

It should be noted that in the present exemplary embodiment, a case of assigning the virtual machine ID (VMid) to the MAC address will be described. However, actually, the virtual machine ID (VMid) may be assigned to the IP address. That is, the virtual machine ID (VMid) can be assigned to at least one of the MAC header and the IP header.

At this time, it is technically possible to assign the transmission-side virtual machine ID (VMid) to the transmission-side MAC address field and assign the reception-side virtual machine ID (VMid) to the reception-side IP address field. Oppositely, it is possible to assign the transmission-side virtual machine ID (VMid) to the transmission-side IP address field and assign the reception-side virtual machine ID (VMid) to the reception-side MAC address field.

Fourth Exemplary Embodiment

Assignment of Virtual Machine ID (VMid) to IP+MAC Address

Referring to FIG. 8, a case of assigning the virtual machine ID (VMid) to each of the MAC address field, the VLAN tag field and the IP address field will be described.

In the fourth exemplary embodiment of the present invention, the virtual machine ID assigning section assigns ID (VMid) of each of the virtual machines to a bit space of a part or whole of the MAC address field, a part of whole of the VLAN tag field, and a part of whole of the IP address field which the existing router and switch can grasp and identify, as shown in (1) of FIG. 8.

However, actually, there is a case that the VLAN tag field itself does not exist. In case of the communication from the virtual server "A" to the virtual server "D", the packet with "MAC DA", "MAC SA", "VLAN Tag", "IP DA", "IP SA" is transmitted.

That is, in the present exemplary embodiment, flows are grouped based on a plurality of header fields in such a manner that of the header fields of the flow are grouped such that the field of transmission destination identification data ("MAC DA", "VLAN Tag", "IP DA") indicates the virtual machine ID of the virtual server "D", and such that the field of transmission source identification data ("MAC SA", "VLAN Tag", "IP SA") indicates the virtual machine ID of the virtual server "A".

Specifically, it is as follows. For example, in case of the communication from the virtual server "A" to the virtual server "D", the transmission-side physical server transmits as TCP/IP packet, a packet containing a part or whole of the MAC address field, a part or whole of the VLAN tag field, and a part or whole of the IP address field corresponding to the virtual machine ID which is assigned to each of the virtual servers "A" and the virtual servers "D".

The relay physical switch grasps a network condition by monitoring the fields of the transmission destination identification data ("MAC DA", "VLAN Tag", "IP DA") and the transmission source identification data ("MAC SA", "VLAN Tag", "IP SA") in the header field of the flow, that is, a combination of the MAC address field, the VLAN tag field and the IP address field, of the TCP/IP packet.

That is, the relay physical switch monitors a combination of the MAC address field, the VLAN tag field and the IP address field of the TCP/IP packet and collects data of the network condition.

The reception-side physical server transmits the received packet to the reception-side virtual server "D".

While in the third exemplary embodiment, the virtual machine ID is incorporated into only the MAC address assigned to each of the virtual servers in advance, in the fourth exemplary embodiment, the virtual machine ID is incorporated into only the MAC address and the IP address assigned to each of the virtual servers in advance, and the transmission packet is generated by using the MAC address, the VLAN tag, and the IP address in the transmission. It should be noted that it is possible not to provide the VLAN tag for the transmission packet.

FIG. 9 is a sequence diagram showing the communication flow control in the fourth exemplary embodiment of the present invention.

(1) Step S401

In the first physical server 10 shown in FIG. 1, the virtual machine ID assigning section 121 of the virtual switch 12 assigns the virtual machine ID to each of the virtual servers 11 (11-$i$, $i$=1 to n).

(2) Step S402

In case of assigning the MAC address to each of the virtual servers 11 (11-$i$, $i$=1 to n), the MAC address assigning section 122 of the virtual switch 12 assigns the MAC address using the virtual machine ID "VMid-A" of the virtual server "A" 11-1 to a part or whole of the MAC address field of the virtual server "A" 11-1.

(3) Step S403

In case of assigning the IP address to each of the virtual servers 11 (11-$i$, $i$=1 to n), the IP address assigning section 122 of the virtual switch 12 assigns the IP address using the virtual machine ID "VMid-A" of the virtual server "A" 11-1 to a part or whole of the IP address field of the virtual server "A" 11-1.

(4) Step S404

In the same way, in the second physical server 20, the virtual machine ID assigning section 221 of the virtual switch 22 assigns the virtual machine ID to each of the virtual servers 21 (21-$i$, $i$=1 to n).

(5) Step S405

In case of assigning the MAC address to each of the virtual servers 21 (21-$i$, $i$=1 to n), the MAC address assigning section 222 of the virtual switch 22 assigns the MAC address using the virtual machine ID "VMid-D" of the virtual server "D" 21-1 to a part or whole of the MAC address field of the virtual server "D" 21-1.

(6) Step S406

In case of assigning the IP address to each of the virtual servers 21 (21-$i$, $i$=1 to n), the IP address assigning section 222 of the virtual switch 22 assigns the IP address using the virtual machine ID "VMid-D" of the virtual server "D" 21-1 to a part or whole of the IP address field of the virtual server "D" 21-1.

(7) Step S407

In case of the communication from the virtual server "A" 11-1 to the virtual server "D" 21-1, in the first physical server 10, the transmission-side virtual server "A" 11-1 generates a TCP/IP packet containing "MAC DA"-"MAC SA"-"VLAN Tag"-"VLAN Tag"-"LP DA"-"IP SA"-"User. Data", and outputs TCP/IP packet to the virtual switch 12 as the transmission packet.

It should be noted that actually, the virtual switch 12 may generate TCP/IP packet every requesting virtual server 11 in response to the data transmission request from the transmission-side virtual server 11. Also, actually, there is a case that the VLAN tag field "VLAN Tag" does not exist. The virtual switch 12 outputs the transmission packet to the NIC 13. Here, the communication flow monitoring section 14 is not used.

(8) Step S408

The NIC 13 transmits the transmission packet to the physical switch 31 to the network.

(9) Step S409

The physical switch 31 transmits the transmission packet to the physical switch 32. The physical switch 32 transmits the transmission packet to the reception-side second physical server 20.

At this time, each of the physical switch 31 and the physical switch 32 grasps the network condition by monitoring a combination of the MAC address field, the VLAN tag field and the IP address field of the transmission packet. That is, each of the physical switch 31 and the physical switch 32 monitors the combination of the MAC address field, the VLAN tag field and the IP address field of the TCP/IP packet and collects data of the network condition.

(10) Step S410

In the reception-side second physical server 20, the NIC 23 receives the transmission packet and outputs it to the virtual switch 12 as the reception packet. The virtual switch 12 transmits the reception packet to the reception-side virtual server "D" 21-1.

Through the above operation, the communication flow condition between the virtual machines can be grasped in the network by using the field of the transmission destination identification data ("MAC DA", "VLAN Tag", "IP DA") and the transmission source identification data ("MAC SA", "VLAN Tag", "IP SA") as the header area of the flow, that is, the field where the existing router and switch can grasp and identify.

Fifth Exemplary Embodiment

Use of Virtual NW ID

Referring to FIG. 10 and FIG. 11, a case of using a VPN (Virtual Private Network) ID and the VLAN ID as the ID of a virtual network (NW) will be described. Here, the VPN ID (VPNid) will be described by using it as an example.

In FIG. 10, in a data center of multi-tenant environment as an example of the use environment of the inter-virtual-server communication identifying system, the environment connected to the data center through a VPN router from a plurality of VPNs is shown.

As shown in FIG. 10, the inter-virtual-server communication identifying system of the present invention contains the first physical server 10, the second physical server 20, the network 30 and a virtual network 40.

The first physical server 10, the second physical server 20 and the network 30 are basically same as those of shown in FIG. 1. Here, the second physical server 20 is a server in the data center of multi-tenant environment. Also, as an example of the virtual servers 21 (21-1, i=1 to n), the virtual server "D1" 21-4, the virtual server "D2" 21-5 and the virtual server "D3" 21-6 are shown. The virtual server "D1" 21-4, the virtual server "D2" 21-5 and the virtual server "D3" 21-6 are equivalent respectively to the virtual servers "D" 21-1 shown in FIG. 1.

The virtual network 40 contains a VPN router 41, a VPN router 42, a VPN router 43 and a VPN router 44.

The VPN router 41 is connected with the physical switch 32. The VPN router 42 is connected with a server which is equivalent to the virtual server "D" 21-1 shown in FIG. 1, of the servers in the data center of multi-tenant environment. Here, the VPN router 42 is connected with the second physical server 20. The VPN router 43 is connected with a server which is equivalent to the virtual server "E" 21-2 shown in FIG. 1, of the servers in the data center of multi-tenant environment. The VPN router 44 is connected with a server which is equivalent to the virtual server "F" 21-3 shown in FIG. 1, of the servers in the data center of multi-tenant environment.

In the fifth exemplary embodiment of the present invention, the virtual machine ID is assigned to the MAC address and the IP address in advance by the virtual machine ID assigning section, the MAC address assigning section and the IP address assigning section.

Thus, the ID of each of the virtual machines can be assigned to a bit space of a part or whole of the MAC address field, a part or whole of the VLAN tag field, and a part or whole of the IP address field which the existing router and switch can grasp and identify.

In case of the communication from the virtual server "A" to the virtual server "D", a packet assigned with "MAC DA", "MAC SA", "VLAN Tag", "IP DA", and "IP SA" is transmitted.

In other words, in the present exemplary embodiment, a plurality of header fields are grouped by supposing that the transmission destination identification data ("MAC DA", "VLAN Tag", "IP DA") shows the virtual machine ID of the virtual server "D" and the transmission source identification data ("MAC DA", "VLAN Tag", "IP DA") shows the virtual machine ID of the virtual server "A". However, actually, there is a case that the VLAN tag field "VLAN Tag" does not exist.

Under multi-tenant environment, when the virtual server "A" (VMid-A) and the virtual server "B" (VMid-B), which are the virtual servers in the identical server, belong to the different tenants, the communication is possible without address collision, because the communication is carried out in an address space of the plurality of headers even under the situation that the same private IP address is assigned to the virtual server "A" (VMid-A), and the virtual server "B" (VMid-B).

Specifically, it is as follows. For example, in case of the communication from the virtual server "A" to the virtual server "D", the transmission-side physical server transmits as the TCP/IP packet, a packet containing the transmission destination identification data ("MAC DA", "VLAN Tag", "IP DA") and the transmission source identification data ("MAC SA", "VLAN Tag", "IP SA"), corresponding to the virtual machine IDs assigned to the virtual server "A" and the virtual server "D", as shown in (1) of FIG. 11. At this time, the header field is encoded by using a part or whole of the MAC address field, a part or whole of the VLAN tag field, a part or whole of the IP address field for appropriately.

The relay physical switch grasps the network condition by monitoring the fields of the transmission destination identification data ("MAC DA", "VLAN Tag", "IP DA") and of the transmission source identification data ("MAC SA", "VLAN Tag", "IP SA") in the header field of the flow of the TCP/IP packets. That is, the relay physical switch monitors a combination of the transmission destination identification data and the transmission source identification data of the TCP/IP packet and collects data of the network condition.

Moreover, in the VPN router which accommodates a plurality of VPNs, it is required to identify which of the VPNs connected with users the packet should be transferred. For the identification, the VPN ID (VPNid) is recognized from a whole ID space ("MAC DA", "VLAN Tag", "IP DA"), and the destination of the packet is changed in the VPN router. There are a plurality of methods in the transmitting method in the VPN router, but basically, it is the encapsulated packet containing the VPNid. As the transmitting method of a packet, there are a "layer 2 encapsulation method" and a "layer 3 encapsulation method" and so on.

In the "layer 2 encapsulation method", layer 2 packet field ("MAC DA", "MAC SA", "VLAN Tag", "IP DA", "IP SA", "User Data") of the received packet is encapsulated just as it is and the encapsulated packet with the VPNid is transferred.

In the "layer 3 encapsulation method", only IP layer (IP layer) field ("IP DA", "IP SA", "User Data") of the received packet is encapsulated and the encapsulated packet with the VPNid is transferred.

The attention points to allow the VMid to be saved in End-to-End in each method will be described below.

(a) In case of the layer 2 encapsulation method, because all the fields of ("MAC DA", "VLAN Tag", "IP DA")-("MAC SA", "VLAN Tag", "IP SA") are preserved and there is the VPNid, there is no problem especially.

(b) In case of the layer 3 encapsulation method, the data of the field of ("MAC DA", "VLAN Tag", or "MAC SA", "VLAN Tag") of the fields of ("MAC DA", "VLAN Tag", "IP DA")-("MAC SA", "VLAN Tag", "IP SA") is degenerated to the VPNid. In case of the layer 3 encapsulation method, End-to-End is dealt with by only the fields of "IP DA" and "IP SA".

The reception-side physical server transmits the reception packet to the reception-side virtual server "D".

Figure 12:
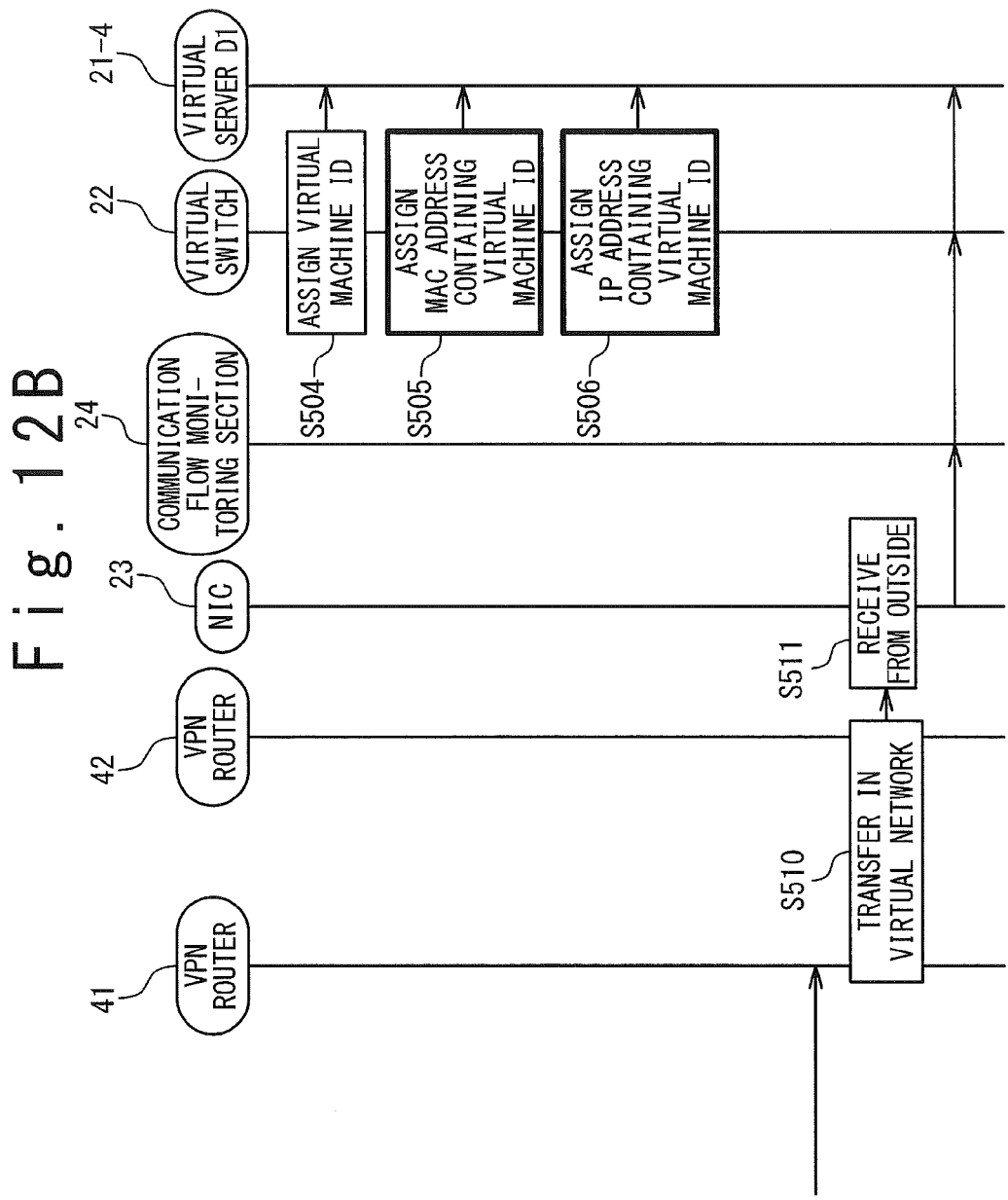
FIG. 12A is a sequence diagram showing the communication flow control in the fifth exemplary embodiment of the present invention.
FIG. 12B is a sequence diagram showing the communication flow control in the fifth exemplary embodiment of the present invention.

FIG. 12A and FIG. 12B are a sequence diagram showing the communication flow control in the fifth exemplary embodiment of the present invention.

(1) Step S501

In the first physical server 10 shown in FIG. 1, the virtual machine ID assigning section 121 of the virtual switch 12 assigns the virtual machine ID to each of the virtual servers 11 (11-i, i=1 to n).

(2) Step S502

The MAC address assigning section 122 of the virtual switch 12 assigns the MAC address using the virtual machine ID "VMid-A" of the virtual server "A" 11-1 to a part or whole of the MAC address field of the virtual server "A" 11-1, in case of assigning the MAC address to each of the virtual servers 11 (11-i, =1 to n).

(3) Step S503

The IP address assigning section 122 of the virtual switch 12 assigns the IP address using the virtual machine ID "VMid-A" of the virtual server "A" 11-1 to a part or whole of the IP address field of the virtual server "A" 11-1 in case of assigning the IP address to each of the virtual servers 11 (11-$i$, i=1 to n).

(4) Step S504

Similarly, in the second physical server 20, the virtual machine ID assigning section 221 of the virtual switch 22 assigns the virtual machine ID to each of the virtual servers 21 (21-$i$, i=1 to n).

(5) Step S505

The MAC address assigning section 222 of also the virtual switch 22 assigns the MAC address using the virtual machine ID "VMid-D" of the virtual server "D" 21-1 to a part or whole of the MAC address field of the virtual server "D" 21-1 in case of assigning the MAC address to each of the virtual servers 21 (21-$i$, i=1 to n).

(6) Step S506

The IP address assigning section 222 of the virtual switch 22 assigns the IP address using the virtual machine ID "VMid-D" of the virtual server "D" 21-1 to a part or whole of the IP address field of the virtual server "D" 21-1 in case of assigning the IP address to each of the virtual servers 21 (21-$i$, i=1 to n).

(7) Step S507

In the first physical server 10, the transmission-side virtual server "A" 11-1 generates a TCP/IP packet containing "MAC DA"-"MAC SA"-"VLAN Tag"-"VLAN Tag"-"IP DA"-"IP SA"-"User Data" in case of the communication from the virtual server "A" 11-1 to the virtual server "D" 21-1, and outputs the TCP/IP packet to the virtual switch 12 as the transmission packet.

It should be noted that actually, the virtual switch 12 may generate the TCP/IP packet every requesting virtual server 11 in response to the data transmission request from the transmission-side virtual server 11. Also, actually, there is a case that the VLAN tag field "VLAN Tag" does not exist. The virtual switch 12 outputs the transmission packet to the NIC 13. Here, the communication flow monitoring section 14 is not used.

(8) Step S508

The NIC 13 transmits the transmission packet to the physical switch 31 in the network.

(9) Step S509

The physical switch 31 transmits the transmission packet to the physical switch 32. The physical switch 32 transmits the transmission packet to the VPN router 41.

At this time, the physical switch 31 and the physical switch 32 grasp the network condition by monitoring the fields of transmission destination identification data ("MAC DA", "VLAN Tag", "IP DA") and the transmission source identification data ("MAC SA", "VLAN Tag", "IP SA") of the transmission packet. That is, the physical switch 31 and the physical switch 32 monitor a combination of the transmission destination identification data and the transmission source identification data of the TCP/IP packet and collect data of the network condition.

(10) Step S510

When receiving the transmission packet from the physical switch 32, the VPN router 41 appropriately uses a part or whole of the MAC address field, a part or whole of the VLAN tag field, and a part or whole of the IP address field of the transmission packet to carry out encoding, and generates the encapsulated packet. Also, the VPN router 41 recognizes the concerned VPNid from the ID space of the above-mentioned fields and determines the encapsulated packet destination. Here, it is supposed that the ID space in the above-mentioned field corresponds to "the VPNid-D".

That is, the VPN router 41 adds "the VPNid-D" to the encapsulated packet and then transfers it to the VPN router 42. The "layer 2 encapsulation method" and the "layer 3 encapsulation method" which are packet transferring methods as described earlier. The VPN router 42 decodes the encapsulated packet to reproduce it to the transmission packet and transmits the transmission packet to the second physical server 20.

(11) Step S511

In the reception-side second physical server 20, the NIC 23 receives and outputs the transmission packet to the virtual switch 12 as the reception packet. The virtual switch 12 determines the virtual server as the transmission destination of the reception packet based on the congestion of each of the virtual servers in the second physical server 20, a port number specified by the reception packet and so on. Here, the virtual switch 12 transmits the reception packet to the virtual server "D1" 21-4.

Through the above operation, the communication flow condition between the virtual machines can be grasped in the network by using the fields called ("MAC DA", "VLAN Tag", "IP DA")-("MAC SA", "VLAN Tag", "IP SA") which the existing router and switch can be grasp. Also, in the VPN router, the communication relation of the virtual machine can be maintained in End-to-End after the appropriate conversion.

Sixth Exemplary Embodiment

Use of Group ID

Figure 13:
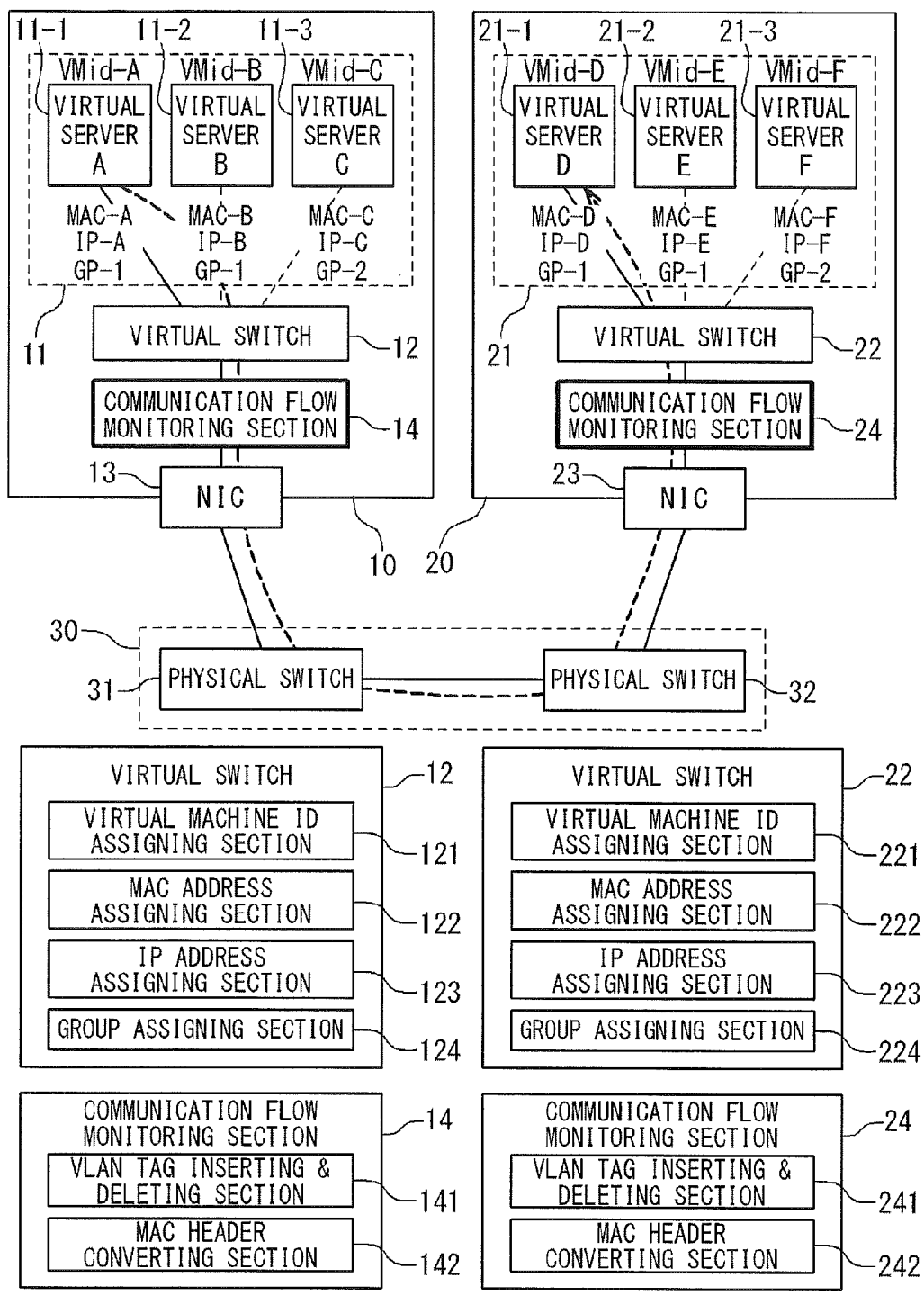
FIG. 13 is a diagram showing a configuration example of the inter-virtual-server communication identifying system of the present invention.

Referring to FIG. 13, a case where the virtual servers are virtually grouped into groups such as VLAN and it is made possible to communicate only between the virtual servers of the identical group will be described.

As shown in FIG. 13, the inter-virtual-server communication identifying system of the present invention is provided with the first physical server 10, the second physical server 20, the network 30 and the virtual network 40.

The first physical server 10, the second physical server 20 and the network 30 are basically the same as those shown in FIG. 1.

In the present exemplary embodiment, the virtual switch 12 is provided with a group assigning section 124 in addition to the virtual machine ID assigning section 121, the MAC address assigning section 122, and the IP address assigning section 123. Moreover, in the same way, the virtual switch 22 is provided with a group assigning section 224 in addition to the virtual machine ID assigning section 221, the MAC address assigning section 222, and the IP address assigning section 223.

The virtual machine ID assigning section 121, the MAC address assigning section 122, and the IP address assigning section 123, the virtual machine ID assigning section 221, the MAC address assigning section 222 and the IP address assigning section 223 are basically the same as those shown in FIG. 1.

The group assigning section 124 assigns a group ID to each of the virtual servers 11 (11-$i$, i=1 to n) to show the VLAN group to which the virtual server 11 (11-$i$, i=1 to n) belongs. In the same way, the group assigning section 224 assigns a group ID to each of the virtual servers 21 (21-$i$, i=1 to n) to show the VLAN group to which the virtual server 21 (21-$i$, i=1 to n) belongs. Here, the VLAN ID is assumed as the group ID.

It should be noted that it is supposed that the MAC address, the IP address, and the group ID are assigned to each of virtual server 11 (11-*i*, i=1 to n) in advance. In the other exemplary embodiments, the same can be applied.

In FIG. 13, it is supposed that the group ID of a first VLAN group is "GP-1", and the group ID of a second VLAN group is "GP-2".

It is supposed that the virtual server "A" 11-1, the virtual server "B" 11-2, the virtual server "D" 21-1, the virtual server "E" 21-2 belong to a first VLAN group "GP-1".

Also, it is supposed that the virtual server "C" 11-3 and the virtual server "F" 21-3 belong to a second VLAN group "GP-2".

At this time, it is possible for the virtual server "A" 11-1, the virtual server "B" 11-2, the virtual server "D" 21-1 and the virtual server "E" 21-2 to communicate to each other. However, the virtual server "C" 11-3 and the virtual server "F" 21-3 can not communicate because the VLAN groups are different.

Referring to FIG. 14, a case where the group ID (VLAN ID) is contained in the packet will be described.

The group ID is assigned to the VLAN tag field by the virtual server when the transmission packet is transmitted onto the network.

The allocation of the virtual machine ID to the transmission packet follows the other exemplary embodiments. In this case, it is supposed that the virtual machine ID (destination ID) of the transmission destination virtual server and the virtual machine ID (Source ID) of the transmission source virtual server are assigned to at least one field of the MAC address field, the VLAN tag field, and the IP address field. It should be noted that although it is desirable that these virtual machine IDs are assigned to the identical field, they may be assigned to the fields which are different.

Relation of Exemplary Embodiments

It should be noted that the above-mentioned exemplary embodiments may be implemented by combining them.
(Generalization)

As mentioned above, the present invention has a feature that in the inter-virtual-server communication identifying system between a plurality of logical servers operating on physical servers, a mechanism is provided to grasp the communication setting in End-to-End between the logical servers, the communication identifying, the performance monitoring, the End-to-End failure diagnostic, and so on.

In the present invention, the following advantages are attained.

The first effect is in that the communication condition between the virtual machines can be grasped in the environment that contains the existing switch and router, because the header field of a conventional packet is used to encode the ID space of the virtual machine.

The second effect is in that the communication condition between the virtual machines can be grasped in the environment that contains the existing switch and router, because the plurality of fields of the conventional packet header are recognized as the ID space of the virtual machine.

The third effect is in that it is possible to carry out a communication even if the IP addresses assigned to the virtual machines in a multi-tenant environment are same, because the plurality of fields of the conventional packet header are recognized as the ID space of the virtual machine.
(Supplementary Note)

It is possible to describe a part or whole of the above-mentioned exemplary embodiments as the following supplementary notes. However, the present invention is not limited to the following examples.

(Supplementary Note 1)

A storage medium which stores a program to make a computer execute the steps of:

controlling a communication of a virtual server assigned with a virtual machine ID (identifier); and transmitting on a network, a transmission packet which the virtual machine ID is assigned to at least a part of a bit space of a field other than a data field of the transmission packet in a form of TCP/IP (Transmission Control Protocol/Internet Protocol) packet, in case of a communication between the virtual server and another virtual server through the network.
(Supplementary Note 2)

The storage medium according to supplementary note 1, which stores a program to make a computer execute the steps of:

inserting a VLAN tag field which contains the virtual machine ID into the transmission packet when transmitting the transmission packet onto the network; and removing the VLAN tag field of a reception packet from the network to transmit to the virtual server.
(Supplementary Note 3)

The storage medium according to supplementary note 1 or 2, which stores a program to make the computer further execute the step of:

converting at least a part of an address field in a header field of the transmission packet which changes into the virtual machine ID, when transmitting the transmission packet onto the network.
(Supplementary Note 4)

The storage medium according to any of supplementary notes 1 to 3, which stores a program to make a computer further execute the steps of:

incorporating the reception-side virtual machine ID into at least one of the MAC address and the IP address and assigning the MAC address and the IP address to the virtual server, and assigning the MAC address to a MAC address field of the transmission packet and the IP address to an IP address field in the transmission packet, when generating the transmission packet.
(Supplementary Note 5)

The storage medium according to supplementary note 4, which stores a program to make a computer further execute the step of:

assigning said virtual machine ID to the virtual server; and further assigning the virtual machine ID to the VLAN tag field of the transmission packet, when generating the transmission packet.
(Supplementary Note 6)

The storage medium according to any of supplementary notes 1 to 5, which stores a program to make a computer further execute the steps of:

assigning the VLAN ID to said virtual server as a group ID, assigning the VLAN ID to the VLAN tag field of the transmission packet, when the VLAN ID assigned to said virtual server as the group ID is same as the VLAN ID assigned to said reception-side virtual server as the group ID.

The exemplary embodiments of the present invention have been described. However, the present invention is not limited to the above-mentioned exemplary embodiments and various modifications are contained in the present invention in a range not deviating from the spirit of the present invention.

It should be noted that Insisting on the priority which is based on Japan application number 2009-218693 by this application and elucidation contents about Japan application number 2009-218693 are incorporated into this application by the quotation.

The invention claimed is:
1. A server, comprising:
a memory storing instructions; and
a processor configured to execute the instructions to:
assign an identifier of a virtual machine operating on the server;
transmit a packet including a Layer 2 header information which includes the identifier of the virtual machine and a first packet field for a VLAN-Tag; and
encapsulate the packet, to generate a second packet field including the Layer 2 header information, with a virtual network identifier representing a virtual network to which the virtual machine belongs.
2. The server according to claim 1, wherein the processor is further configured to execute the instructions to:
receive the packet; and
remove the virtual network identifier from the packet.
3. A system, comprising:
a virtual network; and
a server, comprising:
a memory storing instructions; and
a processor configured to execute the instructions to:
assign an identifier of a virtual machine operating on the server, the virtual machine belonging to the virtual network;
transmit a packet including a Layer 2 header information which includes the identifier of the virtual machine and a first packet field for a VLAN-Tag; and
encapsulate the packet, to generate a second packet field including the Layer 2 header information, with a virtual network identifier representing the virtual network.
4. The system according to claim 3, wherein the processor is further configured to execute the instructions to:
receive the packet; and
remove the virtual network identifier from the packet.

5. A method, comprising:
assigning an identifier of a virtual machine operating on a server;
transmitting a packet including a Layer 2 header information which includes the identifier of the virtual machine and a first packet field for a VLAN-Tag; and
encapsulating the packet, to generate a second packet field including the Layer 2 header information, with a virtual network identifier representing a virtual network to which the virtual machine belongs.
6. The method according to claim 5, further comprising:
receiving the packet; and
removing the virtual network identifier from the packet.
7. A network device, comprising:
a memory storing instructions; and
a processor configured to execute the instructions to:
receive a packet including a Layer 2 header information, the Layer 2 header information including an identifier of a virtual machine operating on a server and a first packet field for a VLAN-Tag; and
encapsulate the packet, to generate a second packet field including the Layer 2 header information, with a virtual network identifier representing a virtual network to which the virtual machine belongs.
8. A method, comprising:
receiving a packet including a Layer 2 header information, the Layer 2 header information including an identifier of a virtual machine operating on a server and a first packet field for a VLAN-Tag; and
encapsulating the packet, to generate a second packet field including the Layer 2 header information, with a virtual network identifier representing a virtual network to which the virtual machine belongs.

* * * * *